(12) United States Patent
Onofrei

(10) Patent No.: US 11,080,113 B1
(45) Date of Patent: Aug. 3, 2021

(54) FIFO QUEUE REPLICATION

(71) Applicant: Amazon Technologies, Inc., Seattle, WA (US)

(72) Inventor: Stefan Mircea Onofrei, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,927

(22) Filed: Dec. 11, 2020

(51) Int. Cl.
*G06F 9/54* (2006.01)

(52) U.S. Cl.
CPC .............. *G06F 9/546* (2013.01); *G06F 9/541* (2013.01); *G06F 2209/543* (2013.01); *G06F 2209/544* (2013.01); *G06F 2209/548* (2013.01)

(58) Field of Classification Search
CPC .............. G06F 9/541; G06F 2209/543; G06F 2209/544; G06F 2209/548; G06F 9/546
See application file for complete search history.

(56) References Cited

U.S. PATENT DOCUMENTS

| | | | |
|---|---|---|---|
| 2005/0149578 A1* | 7/2005 | Sustman | ............. G06F 11/2071 |
| 2015/0120643 A1* | 4/2015 | Dantressangle | ........ G06F 16/27 |
| | | | 707/602 |
| 2017/0235645 A1* | 8/2017 | Theimer | ............. G06F 11/2094 |
| | | | 707/634 |
| 2018/0113766 A1* | 4/2018 | Bourbonnais | ......... G06F 16/215 |
| 2020/0059376 A1* | 2/2020 | Slovetskiy | .......... H04L 12/1877 |

\* cited by examiner

*Primary Examiner* — Brian W Wathen
(74) *Attorney, Agent, or Firm* — Robert C. Kowert; Kowert, Hood, Munyon, Rankin & Goetzel, P.C.

(57) ABSTRACT

A fifo queue service of a provider network allows clients replicate a fifo queue to a secondary backup queue of another region. A local instance of the queue service receives and stores send/receive/delete transactions in an order. The service instance applies the transactions to a primary fifo and replicates only the send requests and delete requests to secondary fifo queue of a remote instance of the fifo queue service (e.g., at another region). The remote instance determines, based on ordering metadata of a replicated request, that the replicated request can be stored in accordance with the ordering metadata (e.g., the replicated request depends on another request that has also been received/replicated). In response, the remote secondary instance stores and applies the replicated request to a secondary fifo queue.

20 Claims, 22 Drawing Sheets

FIFO QUEUE REPLICATION

BACKGROUND

Message queues are used by various software applications to send and receive messages. For example, a service provider network may provide a message queuing service that allows messages to be sent between different applications as a way to communicate over the Internet. Although information stored in a queue is ephemeral and is often consumed within a short period of time, that information may be critical for the efficient operation of a business. Therefore, the loss of messages of a queue can result in a large financial loss due to operational disruptions. It may be difficult and time-consuming to recover or re-create data after it is lost in a queue due to power failures or other events. In some cases, it may not be possible to recover queue data that has been lost, which may negatively impact businesses and their customers.

Figure 1:
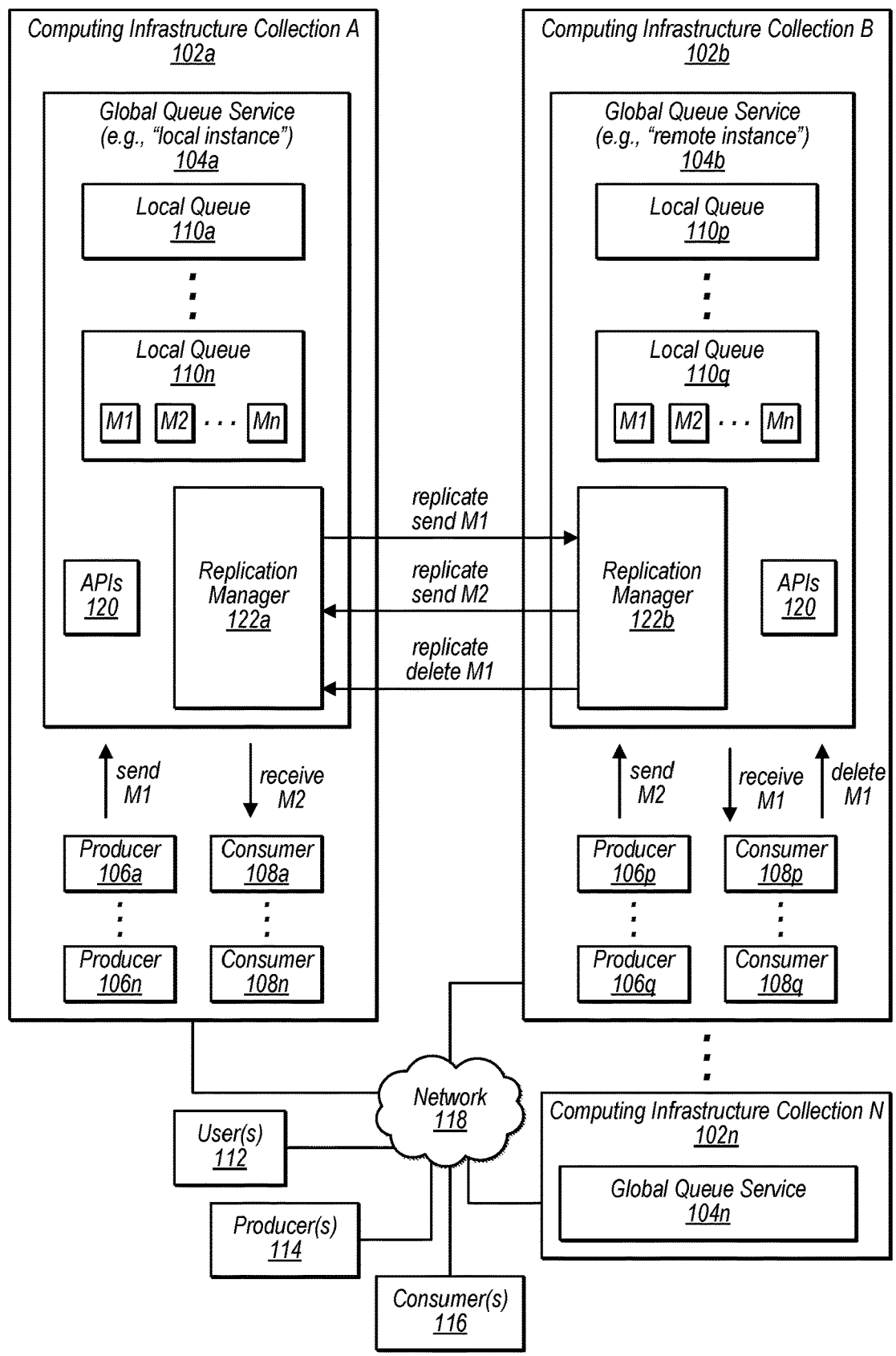
FIG. 1 is a logical block diagram illustrating a system for providing a global queue through replication, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in various combinations and in various embodiments to implement a global queue through replication, according to some embodiments. Systems and methods described herein may be employed in various combinations and in various embodiments to implement fifo queue replication, according to some embodiments.

In embodiments, the various techniques described herein may reduce (or eliminate) the data loss for information stored in queues due to power failures or other events, compared to traditional techniques for recovering from such events. Techniques described herein may also provide consumers access to more queue data (e.g., access to queue data obtained from a remote location/region) compared to traditional techniques.

In various embodiments, a global queue service may replicate transactions for a local queue (e.g., requests to send data to the queue, requests to delete data from the queue) to a remote queue (e.g., another queue in a remote computing infrastructure collection). In embodiments, a fifo queue service may replicate transactions for a primary fifo queue (e.g., requests to send data to the queue, requests to delete data from the queue) to a remote secondary fifo queue (e.g., another fifo queue in a remote computing infrastructure collection). Using various techniques, the order of the transactions in the primary fifo queue may be maintained in the secondary fifo queue, allowing a client to recovery from a failure with little or no loss of queue data. In embodiments, requests from consumers to receive data from a queue may not be replicated. This may reduce bandwidth resource usage and reduce the time required to replicate queue data to a remote queue.

In embodiments, a "computing infrastructure collection" may be a physical location-based grouping and/or logical grouping of computing devices, where the computing devices are physically and/or logically separate from one or more other groups of computing devices that may each also be grouped according to physical location-based grouping and/or logical grouping. For example, one computing infrastructure collection may be a network of computing devices (e.g., servers, routers, etc.) within a geographical area (e.g., city, county, state, country, continent, etc.) and another computing infrastructure collection may be another network of computing devices (e.g., servers, routers, etc.) within a different geographical area (e.g., a different city, county, state, country, continent, etc.). In some embodiments, two or more separate/distinct infrastructures may exist within the same city or other geographical area.

In some embodiments, the computing devices of a computing infrastructure collection may belong to a local network and the computing devices of another computing infrastructure collection may belong to a remote network (e.g., with respect to the local network). For example, a data center located in a city or region of the U.S. (e.g., servers and/or other computing devices that belong to the same local network of the U.S. data center) may be considered a computing infrastructure collection and another data center located in a city or region of Canada (e.g., servers and other computing devices that belong to the same local network of the Canada data center) may be considered another computing infrastructure collection. In embodiments, any country, continent or other area (e.g., regions, cities, metropolitan areas, etc.) may be divided into any number of geographical areas, and each of those geographical areas may include any number of distinct computing infrastructure collections.

As used herein, the term "infrastructure" or "region" may refer to a computing infrastructure collection and vice-versa, in some embodiments. As used herein, a "send" may refer to a request to send a message, a "receive" may refer to a request to receive a message, and a "delete" may refer to a request to delete a message.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 18 and described below.

This specification begins includes descriptions of a system for implementing a global queue through replication and a system for implementing fifo queue replication. A number of different methods and techniques to implement the above techniques are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for implementing a global queue through replication, according to some embodiments.

In the illustrative embodiment, a service provider's network may include any number of different infrastructures 102. Each infrastructure 102 may include a local instance of a global queue service 104 ("local instance 104a") and any number of producers 106 and/or consumers 108 with access to any number of local queues 110 maintained by the local instance 104.

In embodiments, any of the producers and/or consumers may be within another service or application of the provider network (e.g., a producer or consumer application executing on behalf of a client of the provider network). For example, the producer 106a may be a component of a software application provided by a client or a component of a service used by a client.

In various embodiments, any number of clients may configure and/or access services using computing devices of a remote client network. For example, a user 112 of a remote client network may configure and/or control services and applications running at the infrastructure on behalf of the client. In some embodiments, any number of producers 114 and/or consumers 116 of any number of remote client networks may access any the local queues 110 of the local instance 104a and/or any other local queues 110 of any other instances of other infrastructures.

The users 112, producers 114, and consumers 116 may communicate with any of the instances 104/infrastructures 102 via a wide area network 118 (e.g., the Internet). Similarly, any of the instances 104, producers 106, and consumers 108 may communicate with any of the other remote instances 104 via the wide area network 118.

As shown, each local instance 104 includes application programming interfaces (APIs 120). A user may access the APIs 120 to configure and/or control various aspects of the instances/queues (e.g., using a command line interface or graphical user interface of a computing device of a client network). Various other components may perform actions by making calls/requests to the APIs. For example, a producer or a consumer may make an API call in order to request to send a message to a local queue 110, to request to receive a message from a local queue 110, and/or to request to delete a message from a local queue 110.

In the depicted embodiment, each instance 104 of the global queue includes a replication manager 122 that may perform any of the replication actions and/or API calls described herein. In embodiments, any of the local queues 110 of the local instance 104a may be associated (e.g., through replication of requests) with one or more remote queues of one or more remote infrastructures 102 in order to create a "global queue" (e.g., the local queue and the associated remote queue store/maintain the same messages based on replication between the queues). In the example embodiment, local queue 110n of the instance 104a is associated with the local queue 110q of the instance 104b to create a global queue.

As shown, the local instance 104a receives, from the producer 106a, a request to send a message M1 to the local queue 110n. In response to receiving the request to send M1, the local instance stores the message in the local queue 110n and replicates (e.g., using the replication manager 122a) the request to send M1 to the remote queue 110q of the remote instance 104b. The remote instance 104b (e.g., manager 122b) receives the replicated request to send M1 and in response, stores message M1 in the remote queue 110q (e.g., the local queue 110q with respect to instance 104b of the global queue service).

As shown, the instance 104b receives, from the consumer 108p, a request to receive the message M1 from the local queue 110q. In response, the instance 104b sends the message to the consumer 108p, but does not replicate the request to receive M1 to the remote queue 110n (or to any other remote queue).

After sending M1 to the consumer 108p (e.g., after the consumer processes MD, the instance 104b receives, from the consumer 108p, a request to delete the message M1 from the local queue 110q. In response, the instance 104b deletes the message from the local queue 110q and replicates (e.g., via manager 122b) the request to delete M1 to the remote queue 110n of the remote instance 104a. The instance 104a (e.g., manager 122a) receives the replicated request to delete M1 and in response, deletes message M1 from the local queue 110n.

As depicted, the instance 104b receives, from the producer 106p, a request to send a message M2 to the local queue 110q. In response to receiving the request to send M2, the local instance 104b stores the message in the local queue 110q and replicates (e.g., via replication manager 122b) the request to send M2 to the remote queue 110n of the remote instance 104a. The instance 104a (e.g., manager 122a) receives the replicated request to send M2 and in response, stores message M2 in the local queue 110n.

In the example embodiment, the instance 104a receives, from the consumer 108a, a request to receive the message M2 from the local queue 110n. In response, the instance 104a sends the message to the consumer 108a, but does not replicate the request to receive M2 to the remote queue 110*q* (or to any other remote queue associated with local queue 110*n*). As discussed above, this may reduce bandwidth resource usage.

In embodiments, transactions applied to a local queue (requests to send/delete) are replicated to one or more associated remote queues and vice-versa. Therefore, two or more queues may remain in "synch" with each other to effectively create a global queue that may be accessed in any of the instances (e.g., by accessing the local queue).

In some embodiments, messages in a local queue that were replicated from a remote queue may not be visible/accessible to local consumers by default. For example, consumer 108*a* may not have access to M2 as a default configuration. In embodiments, the local instance may receive, from a user, a request (e.g., via an API call) to make replicated messages from the remote queue visible for consumers of the local queue. In response, the local instance may make replicated messages (e.g., M2) visible/accessible for consumers of the local queue. The consumers may then receive and delete the replicated messages (e.g., as described above).

In embodiments, a consumer may make an API call to make replicated messages temporarily visible/accessible to the consumer that allows the consumer to receive and/or delete a message that was replicated from a remote queue. The local instance may receive, from the consumer, an API call that includes 1) an indication to make replicated messages from the remote queue visible in the local queue, and 2) a request to receive a particular replicated message from the local queue. In response, the local instance may send the particular message to the consumer.

In some embodiments, a local queue (e.g., queue A) may replicate sends to an associated remote queue(s), without replicating receives or deletes. The local queue does not accept any replicated requests from the associated remote queue. In response to receiving the replicated send, the remote instance stores the message in the associated remote queue (e.g., queue B). The remote instance may then receive and process requests to receive the message and requests to delete the message from queue B; however, producers are unable to send message to queue B. This embodiment may be referred to as queue "fanout."

In various embodiments, an instance may prevent replication of a send and a delete that are directed to the same message (effectively canceling each other out). This may save bandwidth and improve replication performance. For example, an instance may receive a request send M1 to a local queue and shortly thereafter receive a request to delete M1 (before either request has been replicated). The instance may determine that the send and the delete are directed to the same message. In response, the instance may prevent replication of the send and the delete.

In some embodiments, when a consumer receives a message from a queue, the message may become invisible (or otherwise inaccessible) to any other consumers of the queue (e.g., for at least a threshold amount of time). For example, a consumer may request to receive message M1 from the local queue. In response, the local instance may send M1 to the consumer and also cause M1 to become invisible for at least a threshold amount of time (e.g., one minute). In embodiments, if the threshold amount of time elapses and M1 has not been deleted by the consumer, then M1 may become visible again for any other consumers (e.g., accessible). Therefore, another consumer (e.g., at the local or the remote instance) may then obtain M1 by requesting to receive message M1 from the local queue.

In embodiments, a local instance of a global queue service may apply backpressure (e.g., applied to replication manager 122*a*) in order to maintain a minimum amount of data loss in case of a failure/recovery operation. For example, the local instance (e.g., replication manager 122*a*) may determine that the replication of one or more transactions to the local queue of the remote instance (e.g., replications of requests to send and/or delete applied to the local queue of the local instance) falls behind by at least a certain threshold amount (e.g., replication delay of one minute or more, based on replication delay metrics collected by the replication manager 122*a*). In response, the replication manager 122*a* will stop accepting (e.g., begin rejecting) or reduce the rate of accepting additional requests to replicate transactions to the local queue of the remote instance. When the replication delay becomes less than the threshold amount (e.g., less than one minute), then the replication manager 122*a* may begin accepting requests to replicate again.

In some embodiments, the replication manager 122*a* may begin accepting requests to replicate (or increase the rate of accepting additional requests to replicate transactions) when the delay reaches a smaller value than the threshold value (e.g., a number of seconds smaller or a percentage less than the threshold amount–50% less would be 30 seconds, etc.). In embodiments, the replication delay for a given transaction may be measured as the amount of time (or approximate amount of time) it takes for the local instance to receive an acknowledgment (e.g., transaction replicated, committed, written, etc.) back from the remote instance after the local instance initially replicates/sends the replicated transaction to the remote instance. In embodiments, any other suitable type of replication delay measurement may be made to determine a replication delay for a given transaction.

Figure 2:
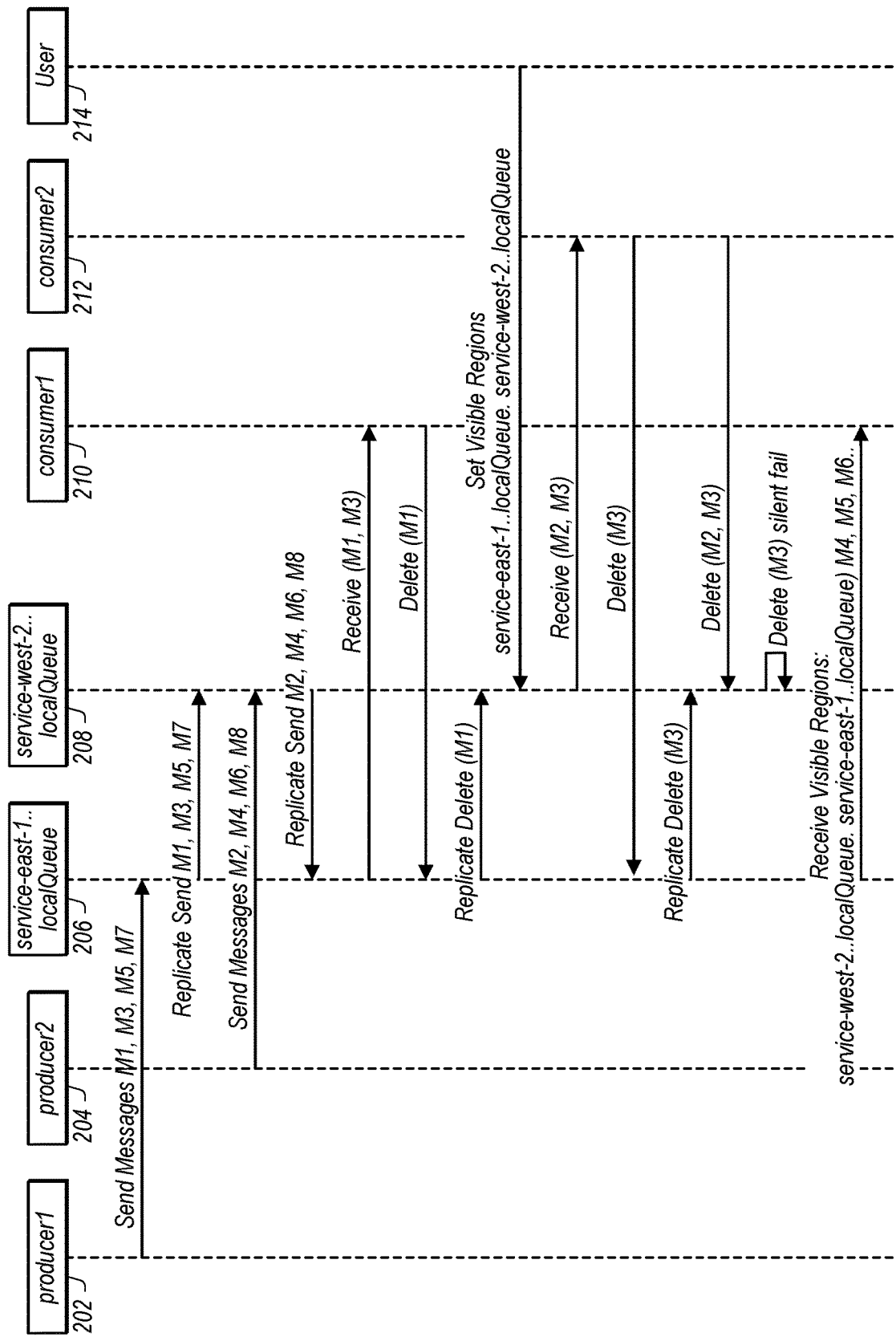
FIG. 2 illustrates replicating transactions for local queues, according to some embodiments.

FIG. 2 illustrates replicating transactions for local queues, according to some embodiments.

In the example embodiment, producer1 202 sends messages M1, M3, M5, and M7 to a queue named service-east-1 . . . localQueue 206 ("queue 206") at an instance of the global queue service at an infrastructure and producer2 204 sends messages M2, M4, M6, and M8 to a queue service-west-2 . . . localQueue 208 (queue 208) at another instance of the global queue service at a remote infrastructure. Consumer1 210 and consumer2 212 may make various API calls to queues (or the instances that include local queues). As shown, consumer1 makes an API call to queue 206 that includes 1) an indication to make messages in queue 206 and queue 208 visible in the queue 206 and 2) a request to receive messages M4, M5, and M6 from queue 206. In response to receiving the API call, queue 206 may send M4, M5, and M6 to consumer1 210.

As depicted, a user may send a request (e.g., via an API call) to the queue 208 to make messages from both of the queues visible in queue 208. After that, consumer2 receives M2 and M3 from queue 208 and then deletes M3 from queue 206. When consumer2 attempts to delete M2 and M3 from queue 208, queue 208 may acknowledge deletion of M3 to consumer2, even though it was already deleted due to replication of the delete from queue 206 to queue 208 (e.g., a silent fail occurs for the delete request). Also shown are various other transactions to send, receive, and delete.

Figure 3:
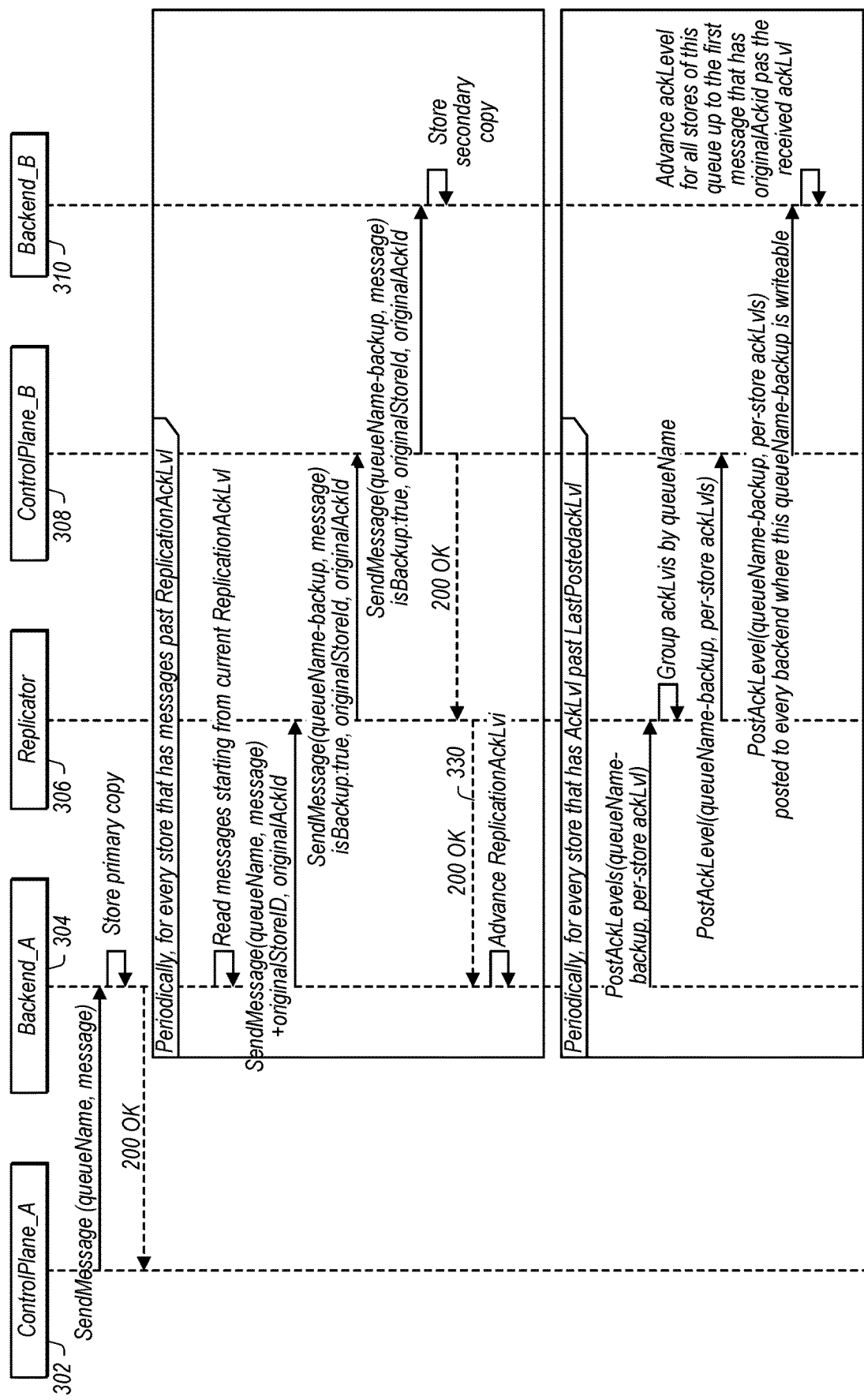
FIG. 3 illustrates replicating multiple queue transactions, according to some embodiments.

FIG. 3 illustrates replicating multiple queue transactions, according to some embodiments.

As shown, producers may send messages via a control plane (e.g., ControlPlane_A 302) to a local queue stored at a backend data store (Backend_A 304) that stores the primary copy of a queue. Periodically, Backend_A 304, a replicator 306, and another control plane (ControlPlane_B 308) may be used to store any messages up to a certain point in time to a remote queue stored at another backend data store (Backend_B 310). As shown, messages may be stored up to a particular replication acknowledgement level, depending on which backup cycle is performed. In various embodiments, any other suitable method for backing up queue messages may be performed on a periodic basis.

Figure 4:
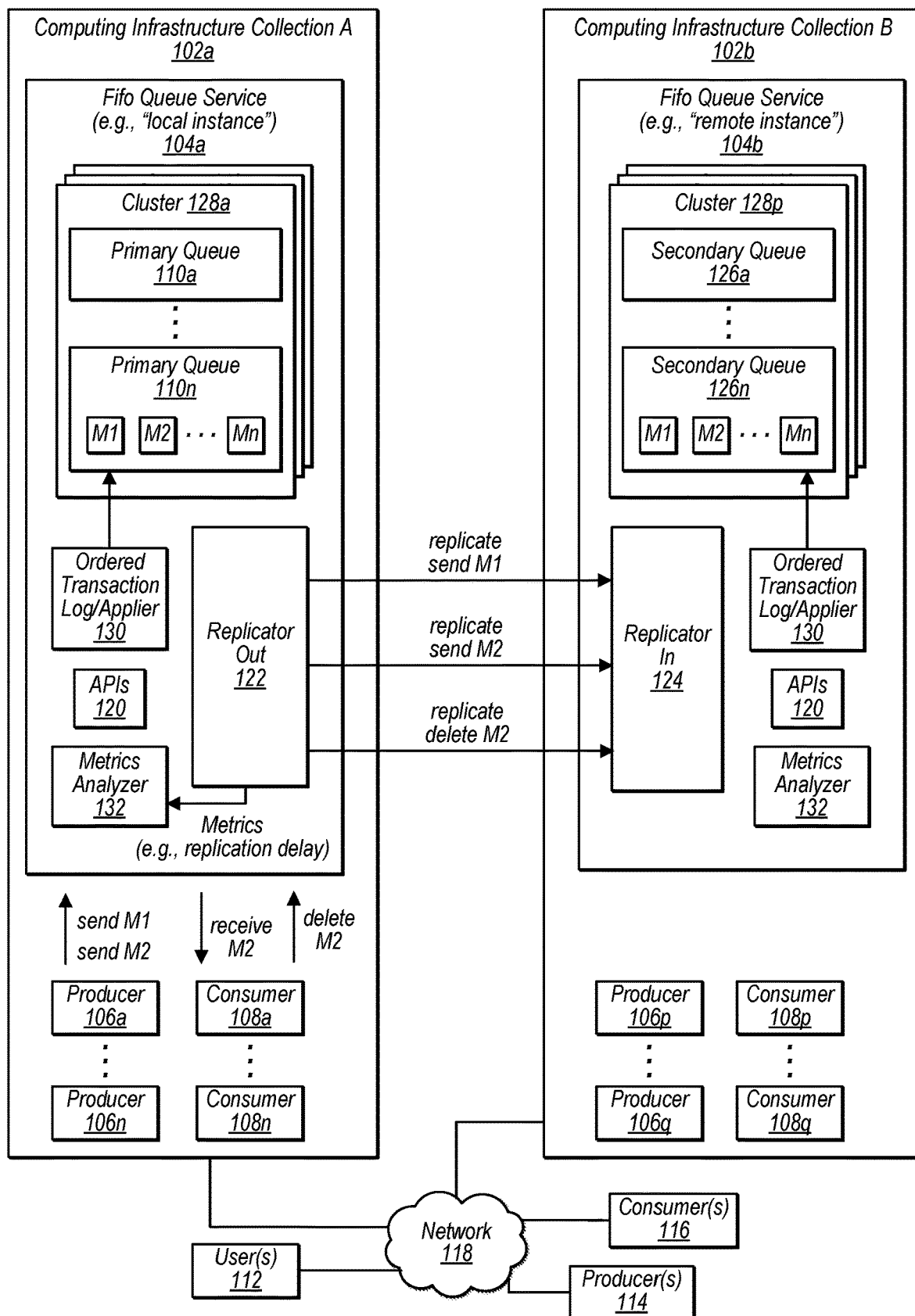
FIG. 4 is a logical block diagram illustrating a system for fifo queue replication, according to some embodiments.

FIG. 4 is a logical block diagram illustrating a system for fifo queue replication, according to some embodiments.

As in FIG. 1, a service provider's network may include any number of different infrastructures 102. Each infrastructure 102 may include a local instance of a fifo queue service 104 ("local instance 104a") and any number of producers 106 and/or consumers 108 with access to any number of primary queues 110 maintained by the local instance 104. However, producers may not have access to some or all of the secondary queues 126 maintained by the local instance 104, in embodiments.

In embodiments, a given instance may have any number of primary queues that replicated to an associated secondary queue of a remote instance and/or any number of secondary queues that receives replicated requests from an associated primary queue of a remote instance. As shown, an instance may have any number of clusters 128 of servers, where each cluster may host any number of primary and/or secondary queues.

Any of the producers and/or consumers may be within another service or application of the provider network (e.g., a producer or consumer application executing on behalf of a client of the provider network). For example, the producer 106a may be a component of a software application provided by a client or a component of a service used by a client.

In embodiments, any number of clients may configure and/or access services using computing devices of a remote client network. For example, a user 112 of a remote client network may configure and/or control services and applications running at the infrastructure on behalf of the client. In some embodiments, any number of producers 114 and/or consumers 116 of any number of remote client networks may access any the local queues 110 of the local instance 104a and/or any other local queues 110 of any other instances of other infrastructures. The users 112, producers 114, and consumers 116 may communicate with any of the instances 104/infrastructures 102 via a wide area network 118 (e.g., the Internet). Similarly, any of the instances 104, producers 106, and consumers 108 may communicate with any of the other remote instances 104 via the wide area network 118.

As in FIG. 1, each local instance 104 includes application programming interfaces (APIs 120). A user may access the APIs 120 to configure and/or control various aspects of the instances/queues (e.g., using a command line interface or graphical user interface of a computing device of a client network). Various other components may perform actions by making calls/requests to the APIs. For example, a producer or a consumer may make an API call in order to request to send a message to a primary queue 110, to request to receive a message from a primary queue 110, and/or to request to delete a message from a primary queue 110.

In the depicted embodiment, each instance 104 of the fifo queue service may include at least one replicator out 122 and/or at least one replicator in 124. The replicator out may perform any of the replication actions and/or API calls described herein to replicate requests to a secondary queue of a remote instance. The replicator in may perform any of the replication actions and/or API calls described herein to receive/process replicated requests from a remote instance that are replicated to a secondary queue. In embodiments, any of the primary queues 110 of the local instance 104a may be associated (e.g., through replication of requests) with a secondary queue 126 of one or more remote infrastructures 102 in order to use the secondary queue 126 as a backup queue (e.g., in case of a need switch the backup queue to be a primary queue). In the example embodiment, the primary queue 110n of the instance 104a is associated with the secondary queue 126n of the instance 104b to create a backup queue.

Each instance of the fifo queue service may include an ordered transaction log/applier(s) 130 (e.g., "log/applier"). As with any other components described herein, the functionality of the log/applier 130 may be broken up into any number of components, in embodiments. As described below, the log/applier 130 may perform various functions, including storing transactions to a queue(s) in an order (e.g., based on metadata of the transactions) and/or applying the transactions in the same order to a primary fifo queue(s) or to a secondary fifo queue(s).

In embodiments, each instance of the fifo queue service may include a metrics analyzer 132. The analyzer 132 may obtain metrics that indicate performance of replication of transactions from one or more primary fifo queues to one or more corresponding secondary queues (e.g., replication delay). Based on one or more role switching criteria (e.g., whether one or more metrics, such as replication delay for one or more transactions, exceed a threshold value), the instance and/or a user may send an API call to the instance that hosts the secondary fifo queue to cause the secondary fifo queue to replace the primary fifo queue as the new primary fifo queue.

In some embodiments, the local instance may determine that one or more of the role switching criteria are met. In response to determining that the one or more of the role switching criteria are met, the local instance may send, to the remote instance, an API call for the secondary fifo queue to replace the primary fifo queue as a new primary fifo queue, accept subsequent replicated requests from the remote instance of the queue service, and reject subsequent requests to send messages, requests to receive messages, and requests to delete messages from producers and/or consumers that are directed to the new secondary fifo queue. In embodiments, the criteria may be replication delay for a particular number (e.g., 10, 100) of transactions exceeds a threshold value and/or the replication delay for transactions exceeds a threshold value for at least a threshold period of time (e.g., 1 minute, 5 minutes).

In embodiments, the local instance 104a receives, from producer 106a, a request to send M1 to primary queue 110n and a request to send M2 to primary queue 110n. The local instance 104a also receives, from consumer 108a, a request to receive M2 and a request to delete M2. The log/applier 130 stores the transactions in an order that is based on dependencies between the different transactions. The log/applier 130 may apply the transactions to the primary fifo queue 110n in the order (e.g., the order as they are stored in the log/applier).

The replicator out 122 may then replicate the requests to send and the request to delete to the secondary fifo queue 126n of the remote instance, without replication of the request to receive (e.g., to reduce bandwidth resource usage). In embodiments, some or all of the replicated requests include metadata that indicates a particular order of the replicated request with respect to the other replicated requests that corresponds to the order of the transactions as they are stored in the log/applier and/or as they are applied to the primary fifo queue 110n. In embodiments, any number of sends, receives, and/or deletes may be processed and/or replicated as described herein.

The remote instance may receive the replicated requests and determine, based on the metadata, that the replicated requests can be stored into the log/applier 130 of the remote instance in accordance with the particular order (e.g., all of the transactions that are depended on by other transactions have been received). In response, the remote instance may store the received replicated requests into the log/applier in accordance with the particular order. The remote instance may apply the received replicated requests to the secondary fifo queue 126n in accordance with the particular order. As a result, the replicated requests of the secondary fifo queue are applied to the secondary fifo queue in accordance with the order of the transactions as they are applied to the primary fifo queue.

In embodiments, a failover API call may be sent to an instance that hosts a secondary fifo queue in order to switch the secondary fifo queue to become the new primary fifo queue. In response to receiving the API call, the instance may begin performing as a primary fifo queue as described herein (this may include accepting subsequent requests to send messages, requests to receive messages, and requests to delete messages from producers and consumers that are directed to the new primary fifo queue as well as reject subsequent replicated requests from the instance of the queue service to the new primary fifo queue).

In embodiments, an instance that hosts a secondary fifo queue may determine, based at least on the metadata of a received replicated request that indicates the particular order of the other received replicated request with respect to another of the requests that was not received by the remote instance, that the received replicated request is unable to be stored into the other transaction log in accordance with the particular order (e.g., due to loss of the other request during replication/transmission). In response, the instance may reject the replicated request. As described herein, in some embodiments the instance may re-try a certain number of times before rejecting the replicated request.

In some embodiments, a primary fifo queue may implement fanout in the same or similar way as described above for the global queue service. For example, a primary fifo queue may replicate sends to an associated secondary queue(s), without replicating receives or deletes. In response to receiving the replicated sends, the remote instance processes the replicated sends as described above (e.g., storing the sends into the log/applier and applying them to the secondary queue). The remote instance may then receive and process requests to receive the messages and requests to delete messages from the secondary queue; however, producers are unable to send messages to the secondary queue.

As described above for FIG. 1, an instance may prevent replication of a send and a delete that are directed to the same message (effectively canceling each other out). This may save bandwidth and improve replication performance. For example, an instance may receive a request send M1 to a primary queue and shortly thereafter receive a request to delete M1 (before either request has been replicated). The instance may determine that the send and the delete are directed to the same message. In response, the instance may prevent replication of the send and the delete to the secondary queue.

In some embodiments, applying transactions to a primary queue or secondary queue may include applying the transactions to multiple hosts that host the primary fifo queue (e.g., distributed across the hosts). In embodiments, applying transactions to a primary queue or secondary queue may include applying one or more of the transactions to multiple hosts (e.g., for improved durability/redundancy).

In various embodiments, a local instance of a fifo queue service may apply backpressure (e.g., applied to replicator out 122) in order to maintain a minimum amount of data loss in case of a failure/recovery operation. For example, the local instance (e.g., metrics analyzer) may determine that the replication of one or more transactions to the secondary queue of the remote instance (e.g., replications of requests to send and/or delete applied to the primary queue) falls behind by at least a certain threshold amount (e.g., replication delay of one minute or more, based on replication delay metrics collected by the metrics analyzer 132). In response, the replicator out 122 will stop accepting (e.g., begin rejecting) or reduce the rate of accepting additional requests to replicate transactions to the secondary queue of the remote instance. When the replication delay becomes less than the threshold amount (e.g., less than one minute), then the replicator out 122 may begin accepting requests to replicate again.

In some embodiments, the replicator out 122 may begin accepting requests to replicate (or increase the rate of accepting additional requests to replicate transactions) when the delay reaches a smaller value than the threshold value (e.g., a number of seconds smaller or a percentage less than the threshold amount–50% less would be 30 seconds, etc.). In embodiments, the replication delay for a given transaction may be measured as the amount of time (or approximate amount of time) it takes for the local instance to receive an acknowledgment (e.g., transaction replicated, committed, written, etc.) back from the remote instance after the local instance initially replicates/sends the replicated transaction to the remote instance. In embodiments, any other suitable type of replication delay measurement may be made to determine a replication delay for a given transaction.

Figure 5:
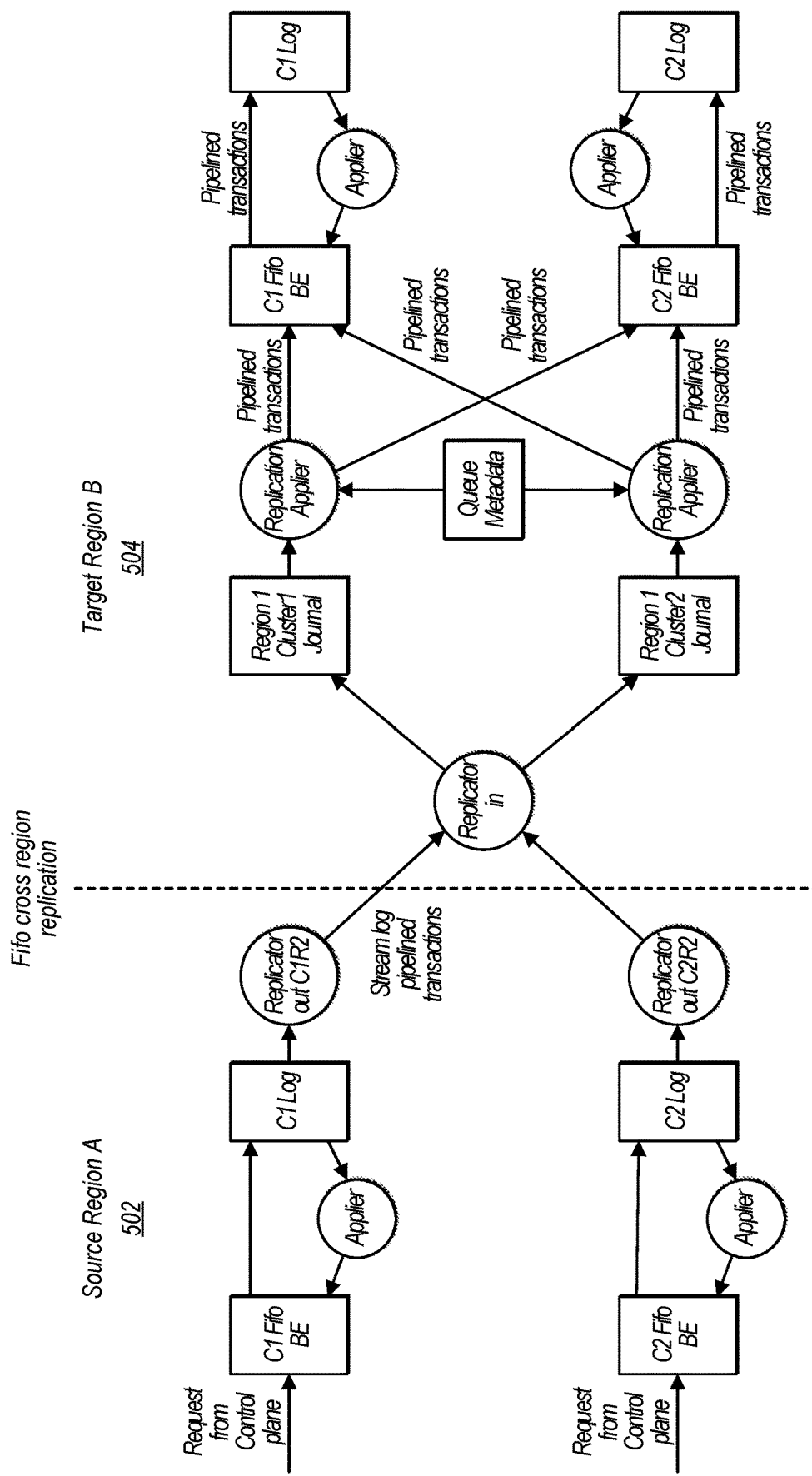
FIG. 5 is a logical block diagram illustrating a system for fifo queue replication, according to some embodiments.

FIG. 5 is a logical block diagram illustrating a system for fifo queue replication, according to some embodiments.

In the depicted embodiment, region A 502 hosts an instance of the fifo queue service that includes two replicator outs. One replicator out receives transactions from one cluster (C1) that are directed to primary queues of C1 and another replicator out receives transactions from another cluster (C2) that are directed to primary queues of C2.

As shown, region B 504 hosts an instance of the fifo queue service that includes one replicator in that receives and processes the transactions from both of the replicator outs of the region A instance. The instance stores the transactions into journals and forwards them to replicator appliers. In the example embodiment, the replicator appliers forward the transactions to either C1 or C2 of the target instance, based on queue metadata. As described above, the applier and log store/apply the transactions in order, based on metadata of the transactions.

In the depicted embodiment, the C1 Log (and C2 Log) stores the correct order of the transactions that are initially received at C1 (and C2). Therefore, C1 Log (and C2 Log) may be considered the source of truth for transaction order. The applier applies the transactions to queues on C1 Fifo BE (and C2 Fifo BE) in the correct order.

Figure 6A:
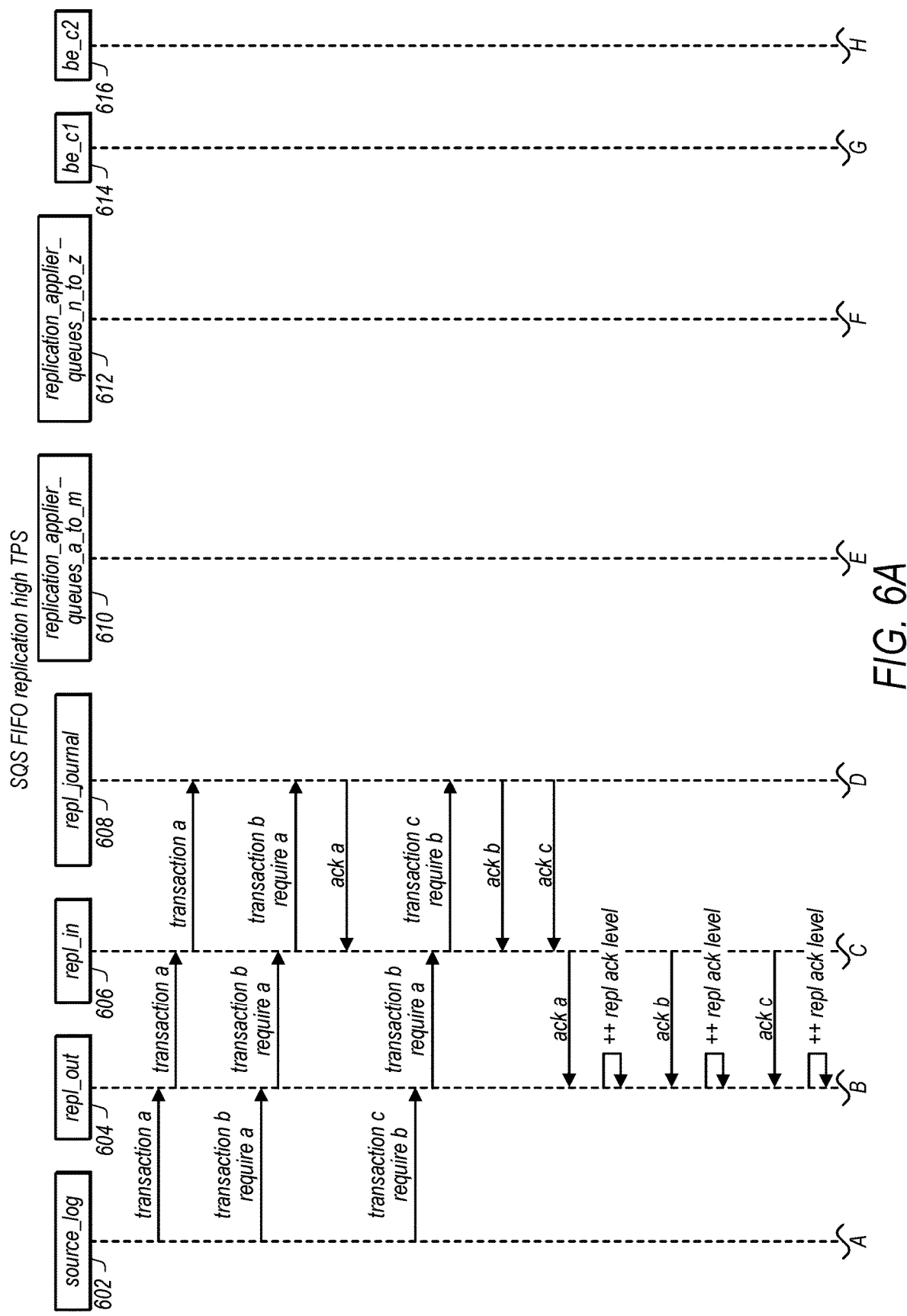
FIGS. 6A-6C illustrates replicating transactions for fifo queues, according to some embodiments.
Figure 6B:
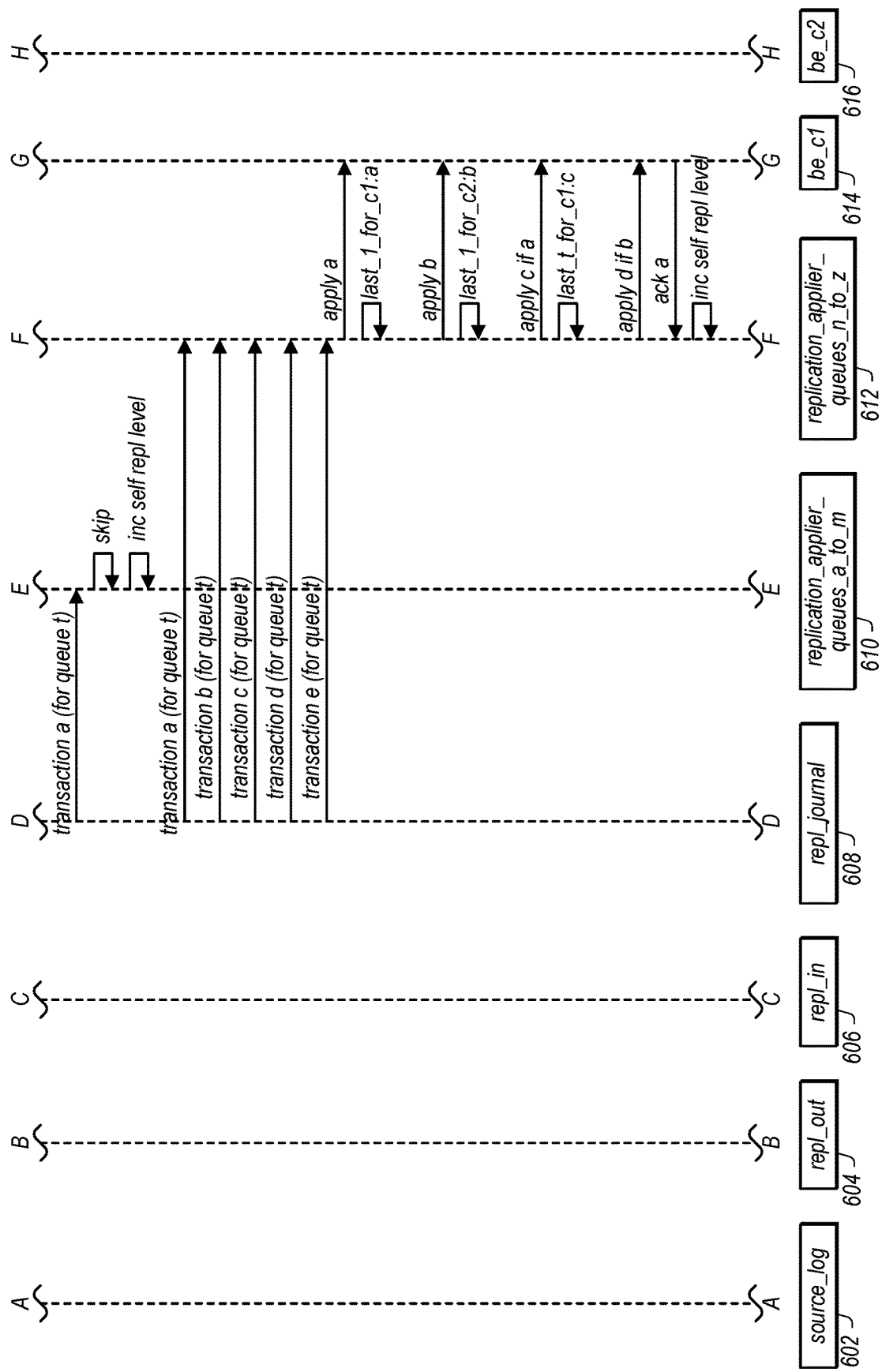
Figure 6C:
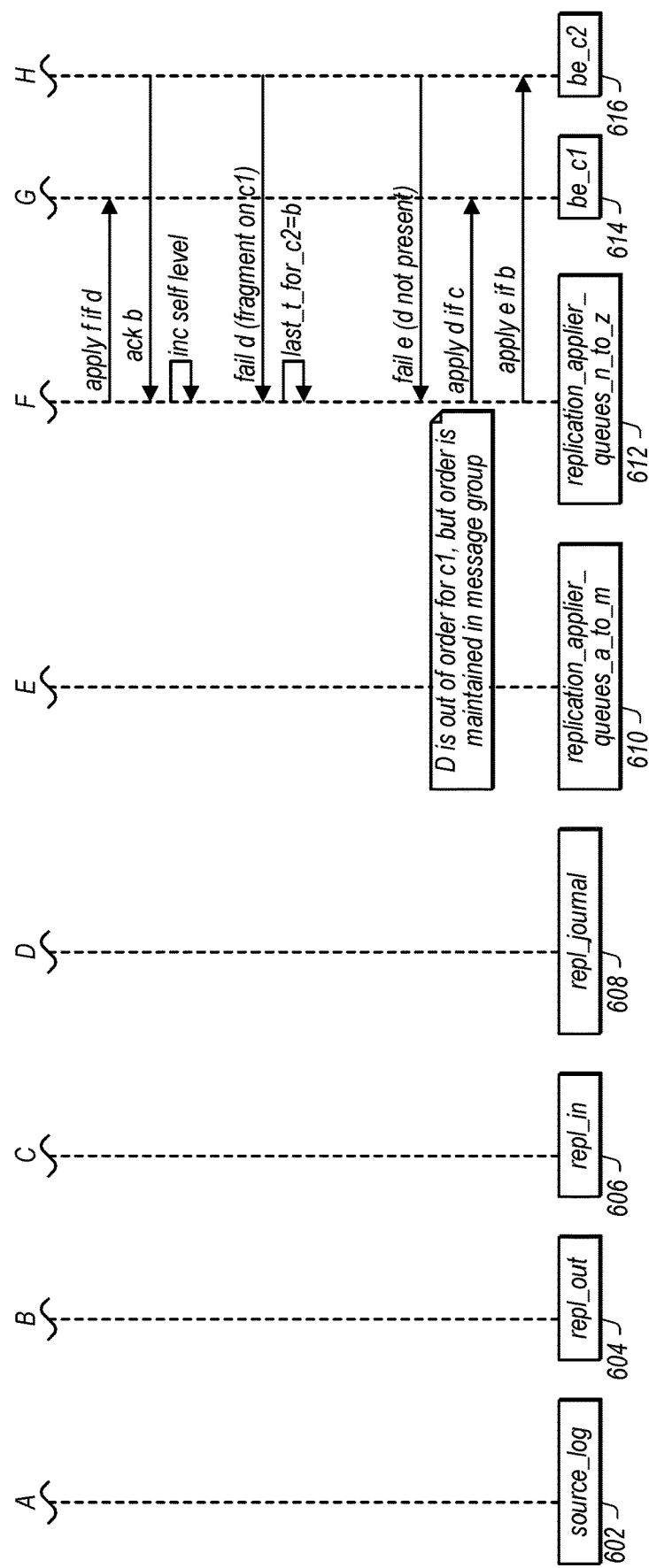

FIGS. 6A-6C illustrates replicating transactions for fifo queues, according to some embodiments.

As depicted in FIG. 6A, transactions may be sent from a source log 602 to a replicator out 604 to a replicator in 606 to a replicator journal 608 without the need to wait for an acknowledgement (ack). This allows faster processing of replicated transactions. As shown, the ack level is incremented upon receiving acks for each transaction.

As shown in FIGS. 6B and 6C, transactions for queue t are routed to the appropriate replication applier. The replication applier keeps track of the last transaction applied and may also increment the replication level in response to receiving an acknowledgment for a transaction.

Figure 7:
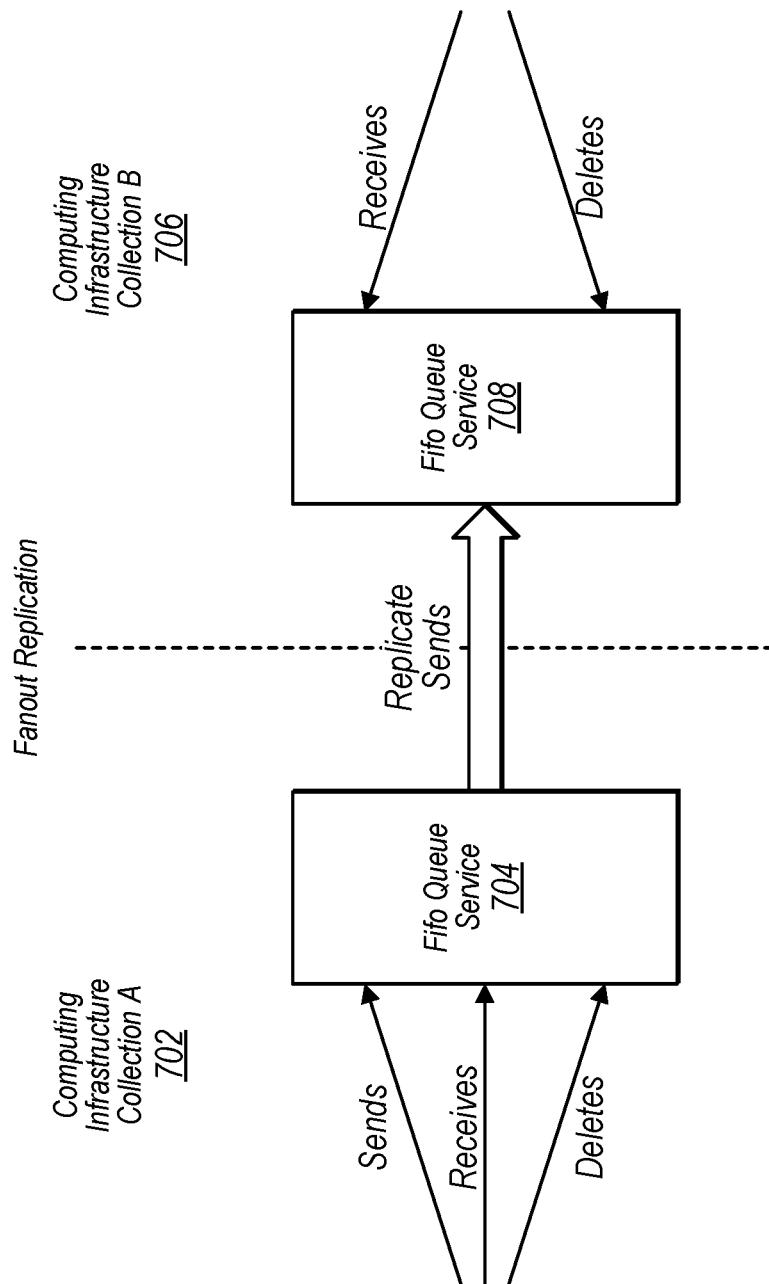
FIG. 7 illustrates cross-region fanout replication, according to some embodiments.

FIG. 7 illustrates fanout replication, according to some embodiments.

As shown, computing infrastructure collection A 702 hosts an instance of a fifo queue service 704 and computing infrastructure collection B 706 hosts an instance of the fifo queue service 708. As described above, a primary fifo queue of region may receive sends, receives, and deletes but only replicates the sends to the secondary fifo queue. The secondary fifo queue may accept/process receives and deletes, but rejects any requests to send a message.

In some embodiments, computing infrastructure collection A 702 may be a region and computing infrastructure collection B 706 may be another region, resulting in cross-region fanout replication. In embodiments, computing infrastructure collection A 702 and computing infrastructure collection B 706 may be within the same region (e.g., two different data centers in the same region, resulting in cross-data center replication).

Figure 8A:
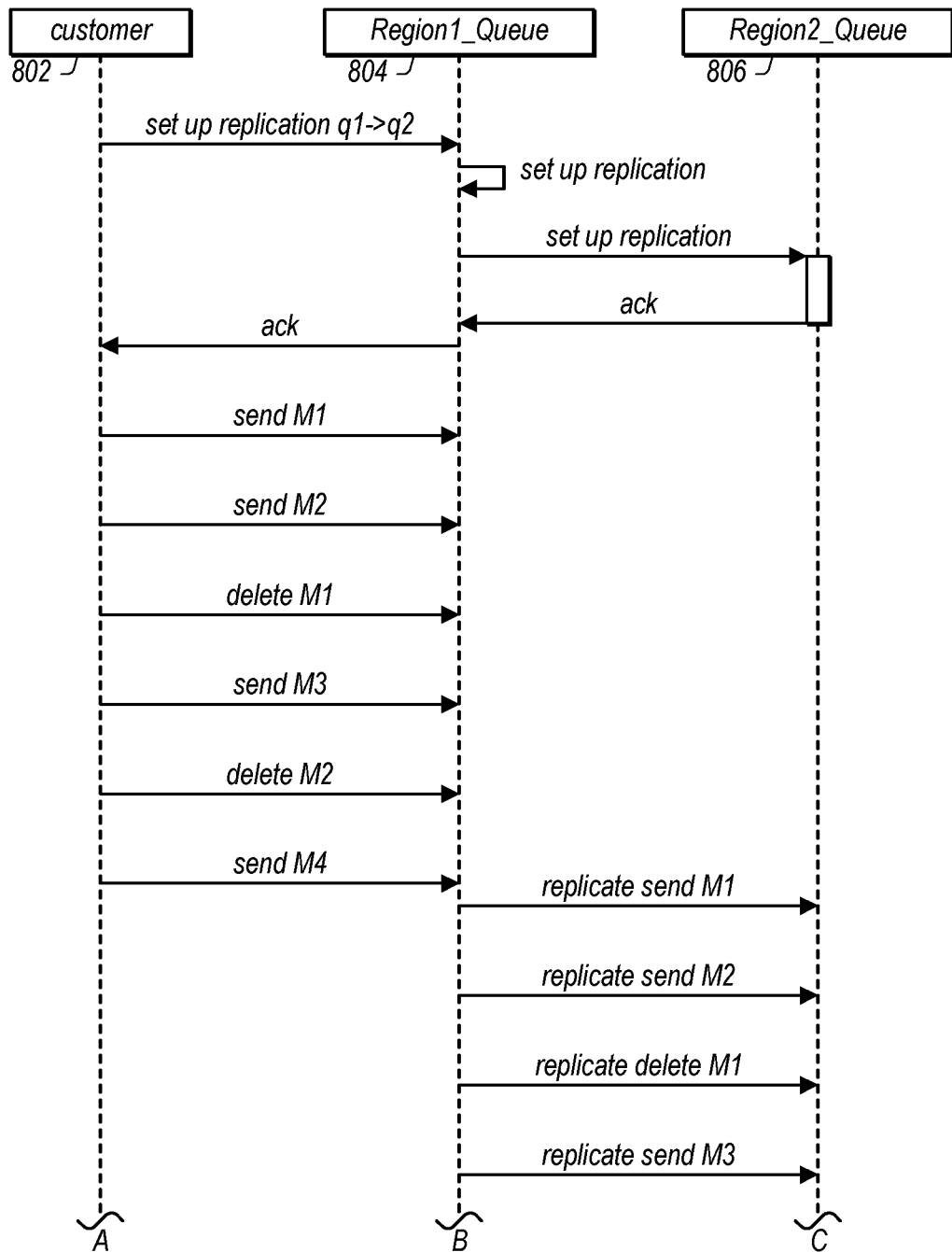
FIGS. 8A-8B illustrate fifo queue failover with data loss, according to some embodiments.
Figure 8B:
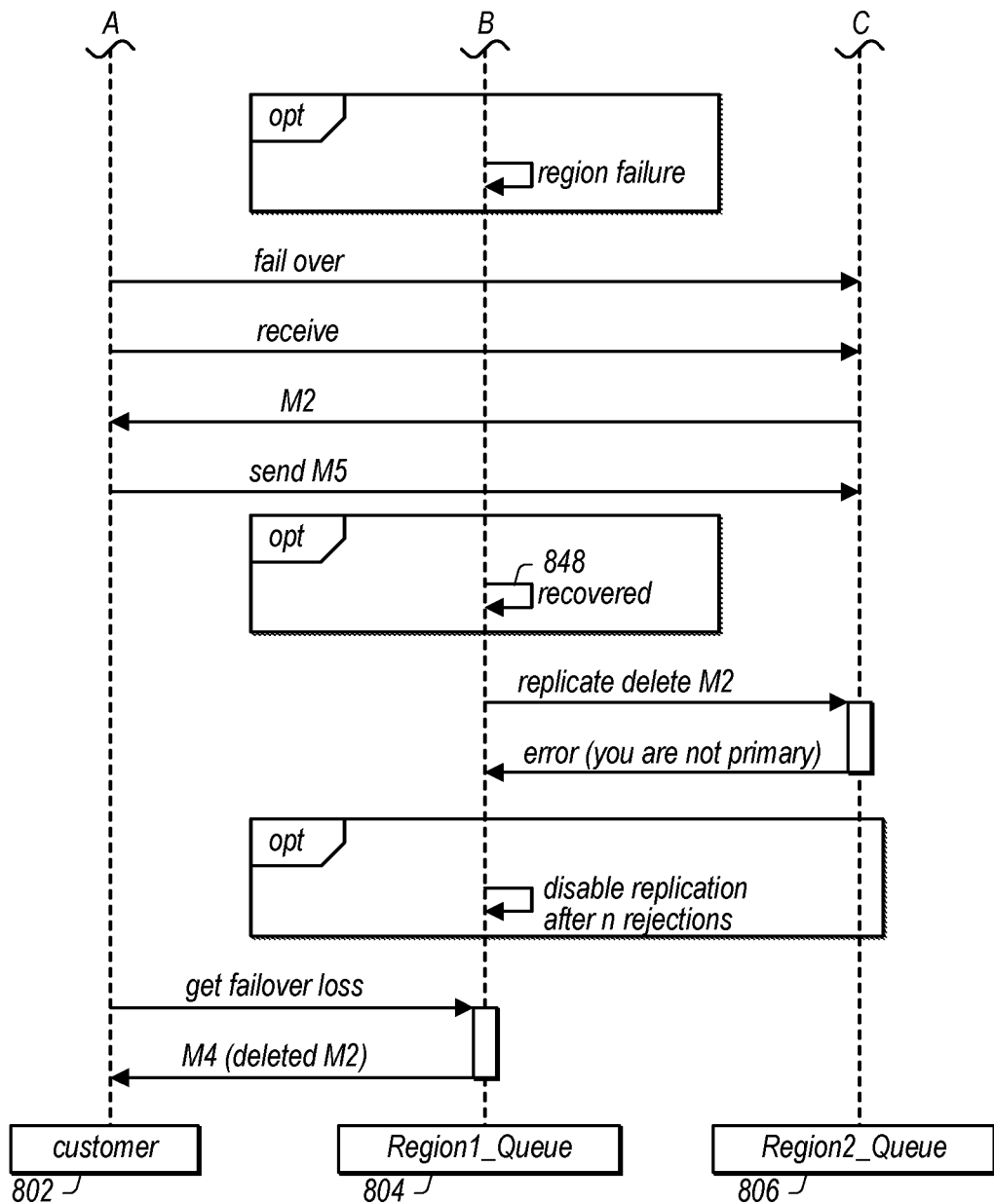

FIGS. 8A-8B illustrate fifo queue failover with data loss, according to some embodiments.

In FIG. 8A, a customer 802 (e.g., client of the fifo queue service) may send an API call to set up replication from a primary queue 804 of region 1 to a secondary queue 806 of region 2. As shown, the service processes multiple transactions. FIG. 8B shows steps/API calls that may be taken to handle a failure of the primary queue in region 1 (Region 1_Queue). Region2_Queue takes over as primary due to the failover call from the customer (e.g., user). When Region 1_Queue recovers, it attempts to replicate M2, but receives an error message. Some data loss occurs due to the region failure. However, the user may recover lost data by making a call to Region 1_Queue (get failover loss).

Figure 9A:
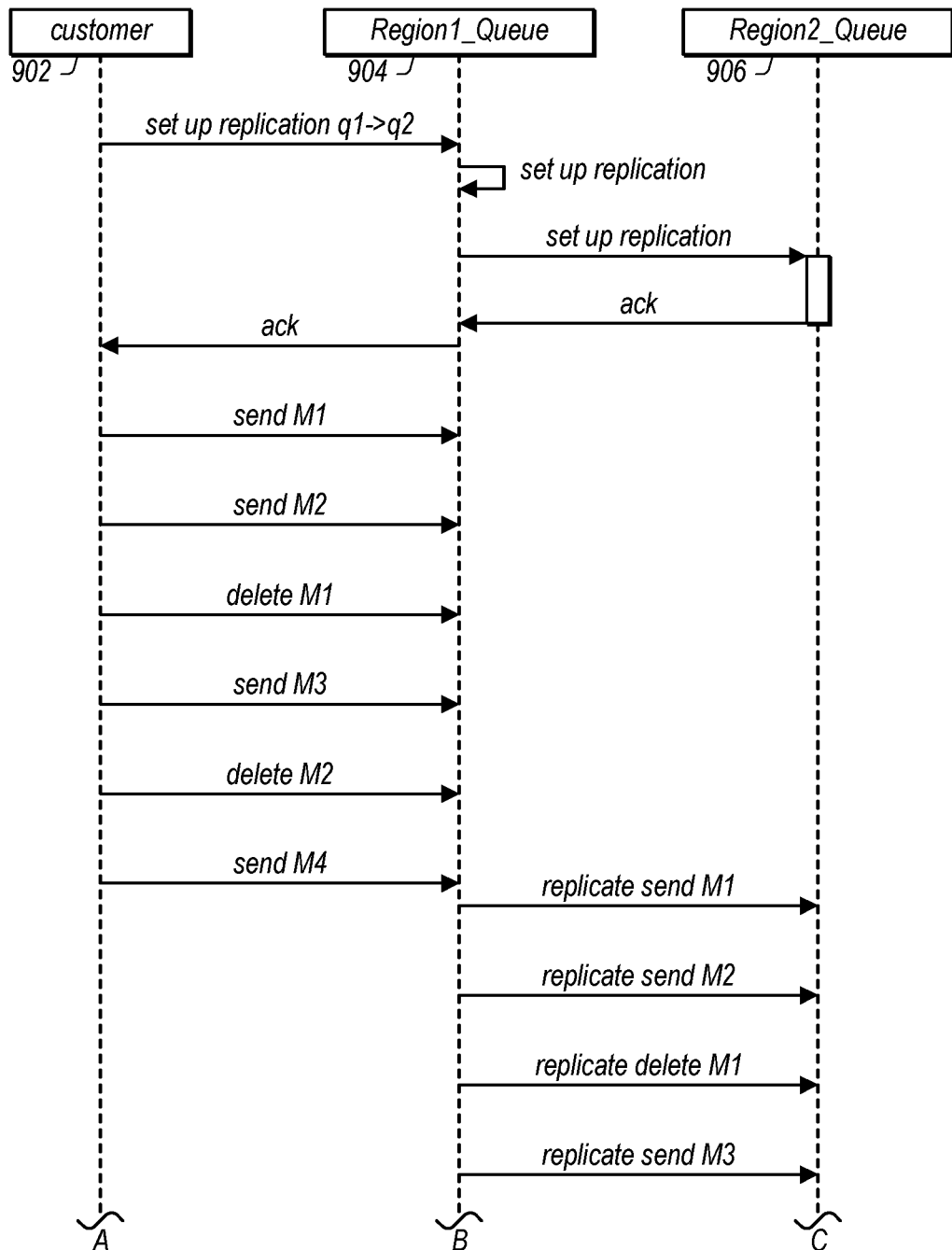
FIGS. 9A-9B illustrate fifo queue failover with no data loss, according to some embodiments.
Figure 9B:
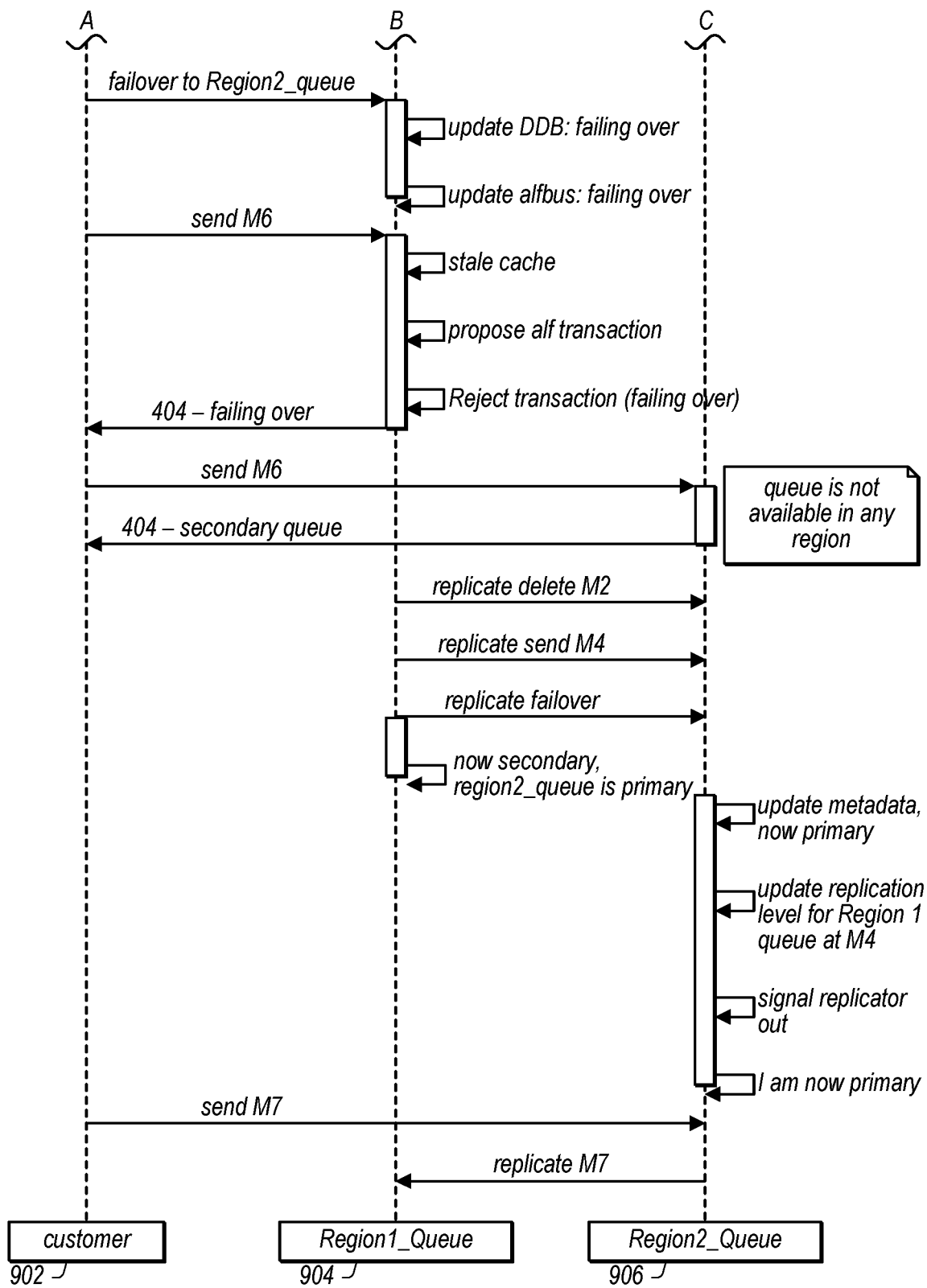

FIGS. 9A-9B illustrate fifo queue failover with no data loss, according to some embodiments.

As shown in FIG. 9A, a customer 902 (e.g., client of the fifo queue service) may send an API call to set up replication from a primary queue 904 of region 1 to a secondary queue 906 of region 2. As shown, the service processes multiple transactions. FIG. 9B shows steps/API calls that may be taken to handle a failure of the primary queue in region 1. As shown, there is a brief period in which neither of the queues is available. Therefore, an error message (404—secondary queue) may be returned if a transaction is sent to either queue during this period of time. Once Region2_Queue switches to primary queue status, it begins to process transactions (e.g., send M7).

Figure 10:
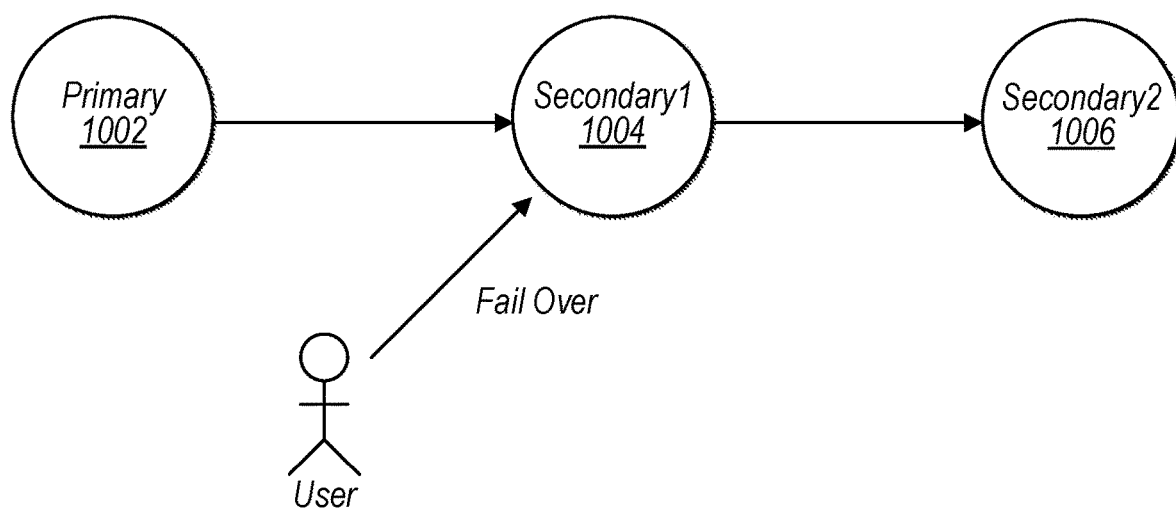
FIG. 10 illustrates chained replication of fifo queues, according to some embodiments.

FIG. 10 illustrates chained replication of fifo queues, according to some embodiments.

As shown, request that are replicated from the primary queue 1002 of an instance to a secondary queue 1004 of another instance may be replicated again to another secondary queue of another instance (e.g., further down the chain). This may provide an additional level of data protection for the fifo queue. In embodiments, any number of additional secondary queues/instances may be added to the chain for improved durability. In some embodiments, a primary queue may have any number of multiple target queues in other instances. In order to maintain consistency in such embodiments, the secondary queues may need to exchange their state and/or negotiate a primary queue and synch data between them.

Figure 11:
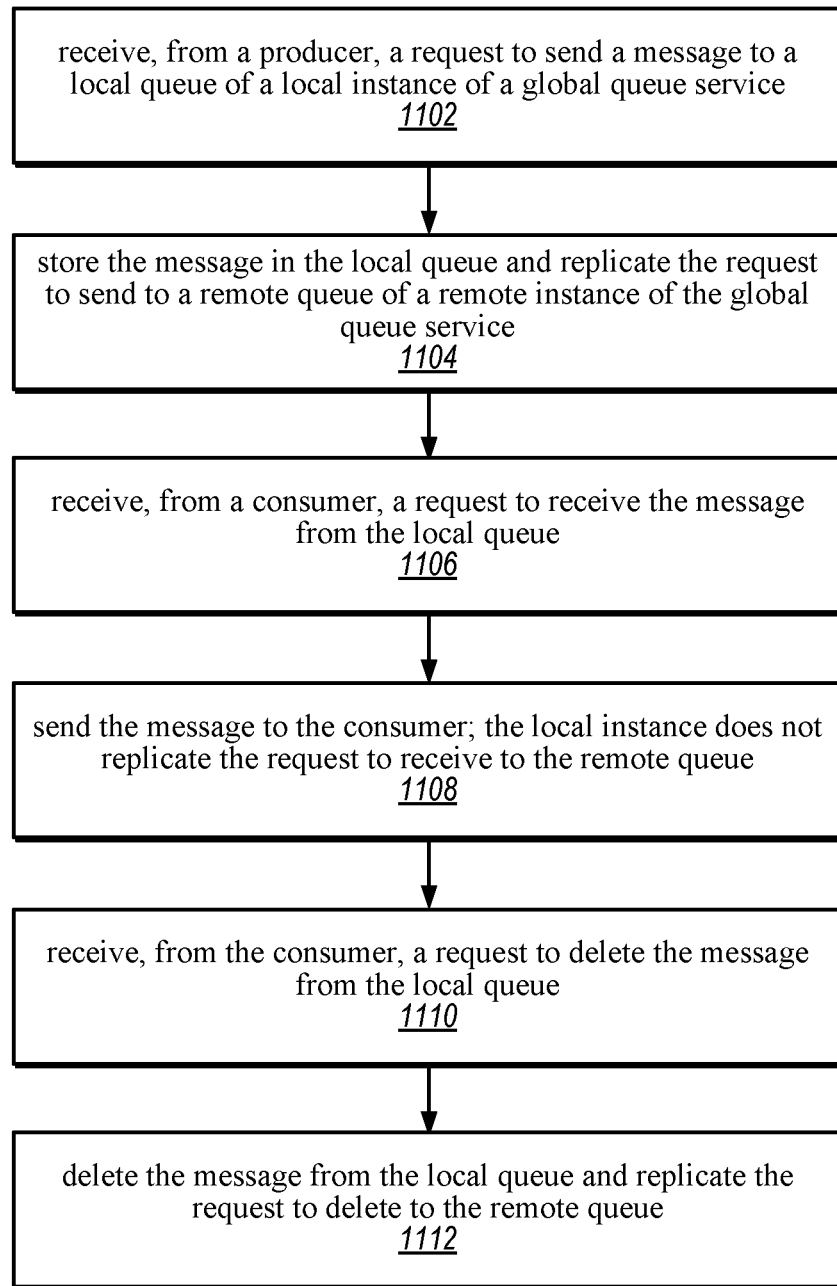
FIG. 11 illustrates a flow diagram for providing a global queue through replication, according to some embodiments.

FIG. 11 illustrates a flow diagram for providing a global queue through replication, according to some embodiments. These techniques, as well as the techniques discussed with regard to FIGS. 12-17, may be implemented using components or systems as described above with regard to FIGS. 1-10, as well as other types of components or systems, and thus the following discussion is not intended to be limiting as to the other types of systems that may implement the described techniques.

At block 1102, an instance of a global queue service receives, from a producer, a request to send a message to a local queue of the local instance. At block 1104, the instance stores the message in the local queue and replicates the request to send to a remote queue of a remote instance of the global queue service. In the example embodiment, two instances of the global queue service implement a global queue (e.g., using a local queue at each instance). However, in various embodiments, a global queue may be implemented across any number of instances of the global queue service (e.g., using a local queue at each instance). Therefore, a local instance may replicate a given request to send or a given request to delete to a remote queue of any number of other remote instances of the global queue service.

At block 1106, the instance receives, from a consumer, a request to receive the message from the local queue. At block 1108, the instance sends the message to the consumer; the local instance does not replicate the request to receive to the remote queue. At block 1110, the instance receives, from the consumer, a request to delete the message from the local queue. At block 1112, the instance delete the message from the local queue and replicate the request to delete to the remote queue.

Figure 12:
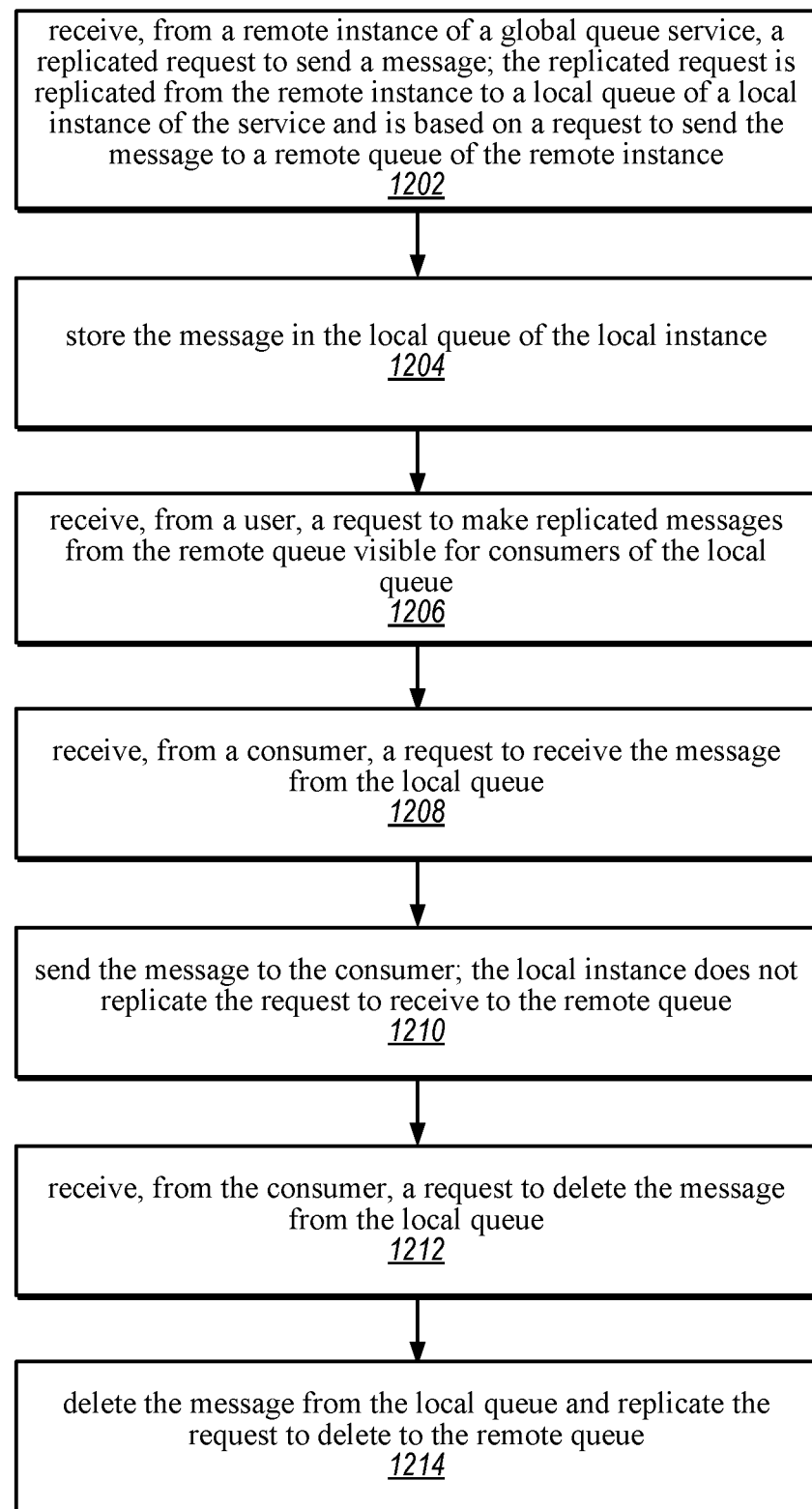
FIG. 12 illustrates a flow diagram for providing a global queue through replication, according to some embodiments.

FIG. 12 illustrates a flow diagram for providing a global queue through replication, according to some embodiments.

At block 1202, a local instance receives, from a remote instance of a global queue service, a replicated request to send a message; the replicated request is replicated from the remote instance to a local queue of a local instance of the service and is based on a request to send the message to a remote queue of the remote instance. At block 1204, the local instance stores the message in the local queue.

At block 1206, the local instance receives, from a user, a request to make replicated messages from the remote queue visible for consumers of the local queue. At block 1208, the local instance receives, from a consumer, a request to receive the message from the local queue. At block 1208, the local instance sends the message to the consumer; the local instance does not replicate the request to receive to the remote queue. At block 1210, the local instance receives, from the consumer, a request to delete the message from the local queue. At block 1212, the local instance deletes the message from the local queue and replicate the request to delete to the remote queue.

Figure 13:
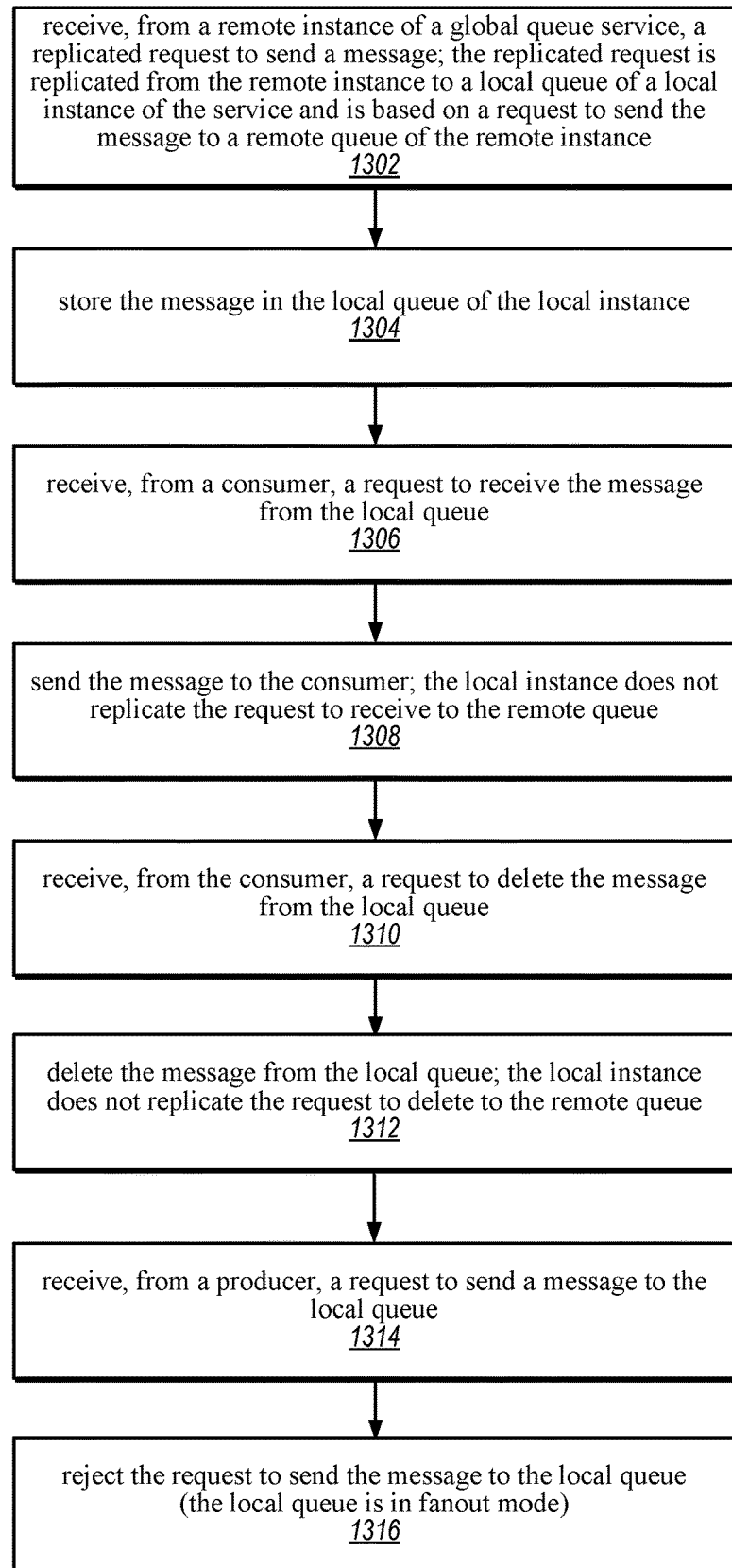
FIG. 13 illustrates a flow diagram for local queue fanout replication, according to some embodiments.

FIG. 13 illustrates a flow diagram for local queue fanout replication, according to some embodiments.

At block 1302, a local instance receives, from a remote instance of a global queue service, a replicated request to send a message; the replicated request is replicated from the remote instance to a local queue of a local instance of the service and is based on a request to send the message to a remote queue of the remote instance. At block 1304, the local instance stores the message in the local queue. At block 1306, the local instance receives, from a consumer, a request to receive the message from the local queue.

At block 1308, the local instance sends the message to the consumer; the local instance does not replicate the request to receive to the remote queue. At block 1310, the local instance receives, from the consumer, a request to delete the message from the local queue. At block 1312, the local instance deletes the message from the local queue; the local instance does not replicate the request to delete to the remote queue. At block 1314, the local instance receives, from a producer, a request to send a message to the local queue. At block 1316, the local instance rejects the request to send the message to the local queue.

Figure 14:
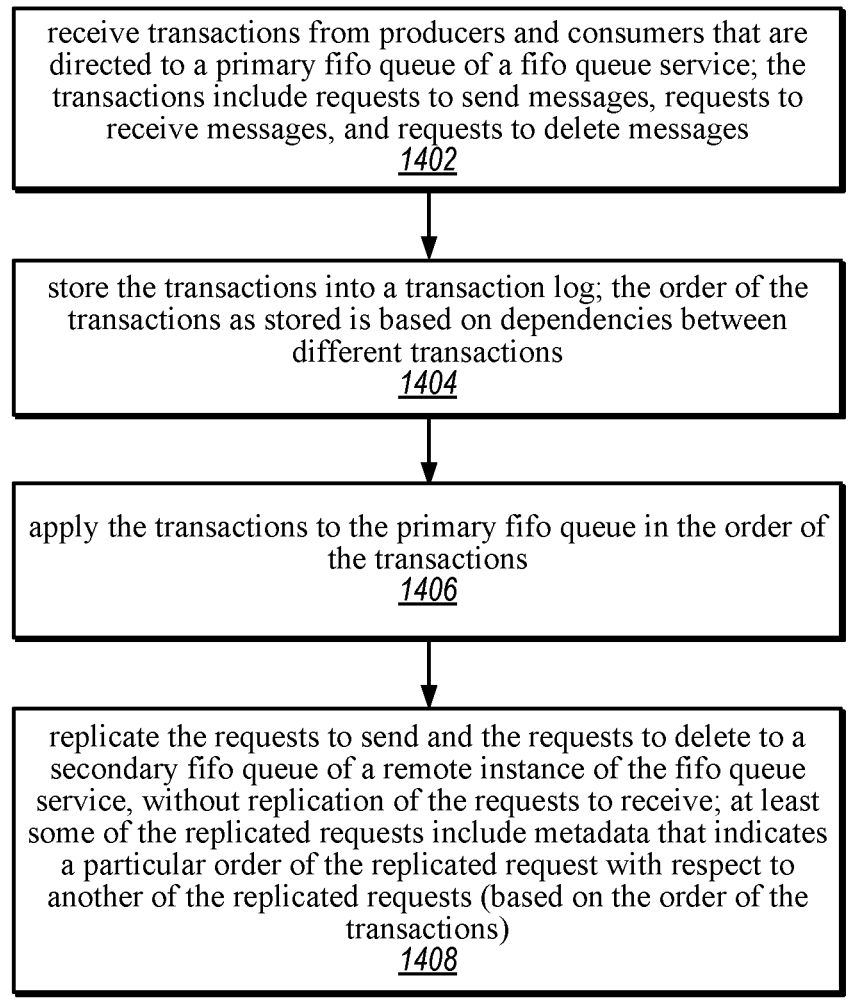
FIG. 14 illustrates a flow diagram for replicating from a primary fifo queue, according to some embodiments.

FIG. 14 illustrates a flow diagram for replicating from a primary fifo queue, according to some embodiments At block 1402, the instance of the fifo queue service receives transactions from producers and consumers that are directed to a primary fifo queue of a fifo queue service; the transactions include requests to send messages, requests to receive messages, and requests to delete messages. At block 1404, the instance stores the transactions into a transaction log; the order of the transactions as stored is based on dependencies between different transactions.

At block 1406, the instance applies the transactions to the primary fifo queue in the order of the transactions. At block 1408, the instance replicates the requests to send and the requests to delete to a secondary fifo queue of a remote instance of the fifo queue service, without replication of the requests to receive; at least some of the replicated requests include metadata that indicates a particular order of the replicated request with respect to another of the replicated requests (based on the order of the transactions).

Figure 15:
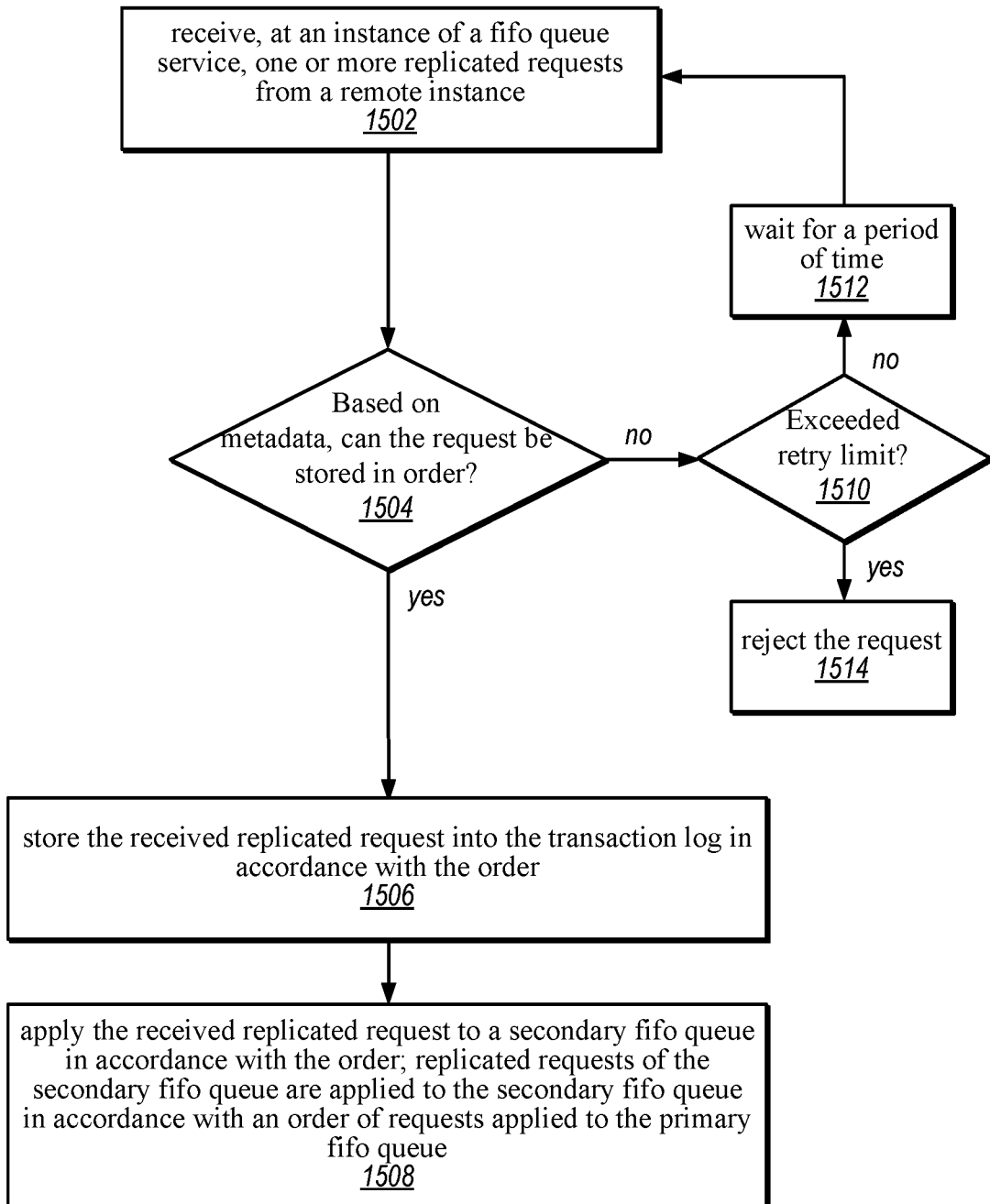
FIG. 15 illustrates a flow diagram for replicating to a secondary fifo queue, according to some embodiments.

FIG. 15 illustrates a flow diagram for replicating to a secondary fifo queue, according to some embodiments.

At block 1502, an instance of a fifo queue service receives one or more replicated requests from a remote instance. At block 1504, the instance determines, based on metadata of the transactions, whether a replicated request can be stored in order. If so, then at block 1506, the instance stores the received replicated request into the transaction log in accordance with the order. The instance then applies the received replicated request to a secondary fifo queue in accordance with the order; replicated requests of the secondary fifo queue are applied to the secondary fifo queue in accordance with an order of requests applied to the primary fifo queue.

Returning to block 1504, if the instance determines, based on metadata of the transactions, that the replicated request cannot be stored in order, then at block 1510, the instance determines whether the re-try limit has been exceeded. If not, then at block 1512, the instance waits for a predefined period of time and then returns to block 1502. If so, then at block 1514, the instance rejects the request.

Figure 16:
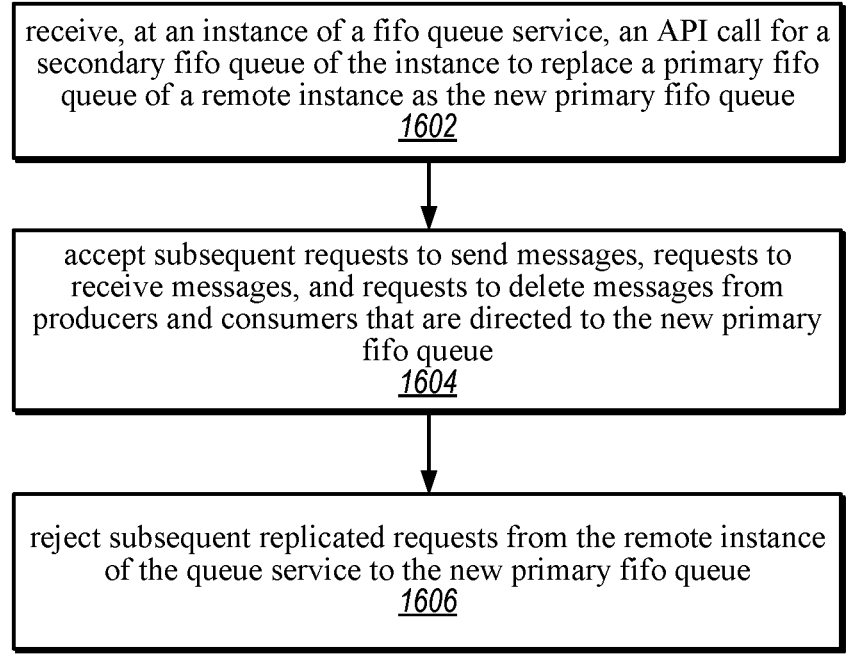
FIG. 16 illustrates a flow diagram for switching a secondary fifo queue to become a primary fifo queue, according to some embodiments.

FIG. 16 illustrates a flow diagram for switching a secondary fifo queue to become a primary fifo queue, according to some embodiments.

At block 1602, an instance receives an API call for a secondary fifo queue of the instance to replace a primary fifo queue of a remote instance as the new primary fifo queue. At block 1604, the instance accepts subsequent requests to send messages, requests to receive messages, and requests to delete messages from producers and consumers that are directed to the new primary fifo queue. At block 1606, the instance reject subsequent replicated requests from the remote instance of the queue service to the new primary fifo queue.

Figure 17:
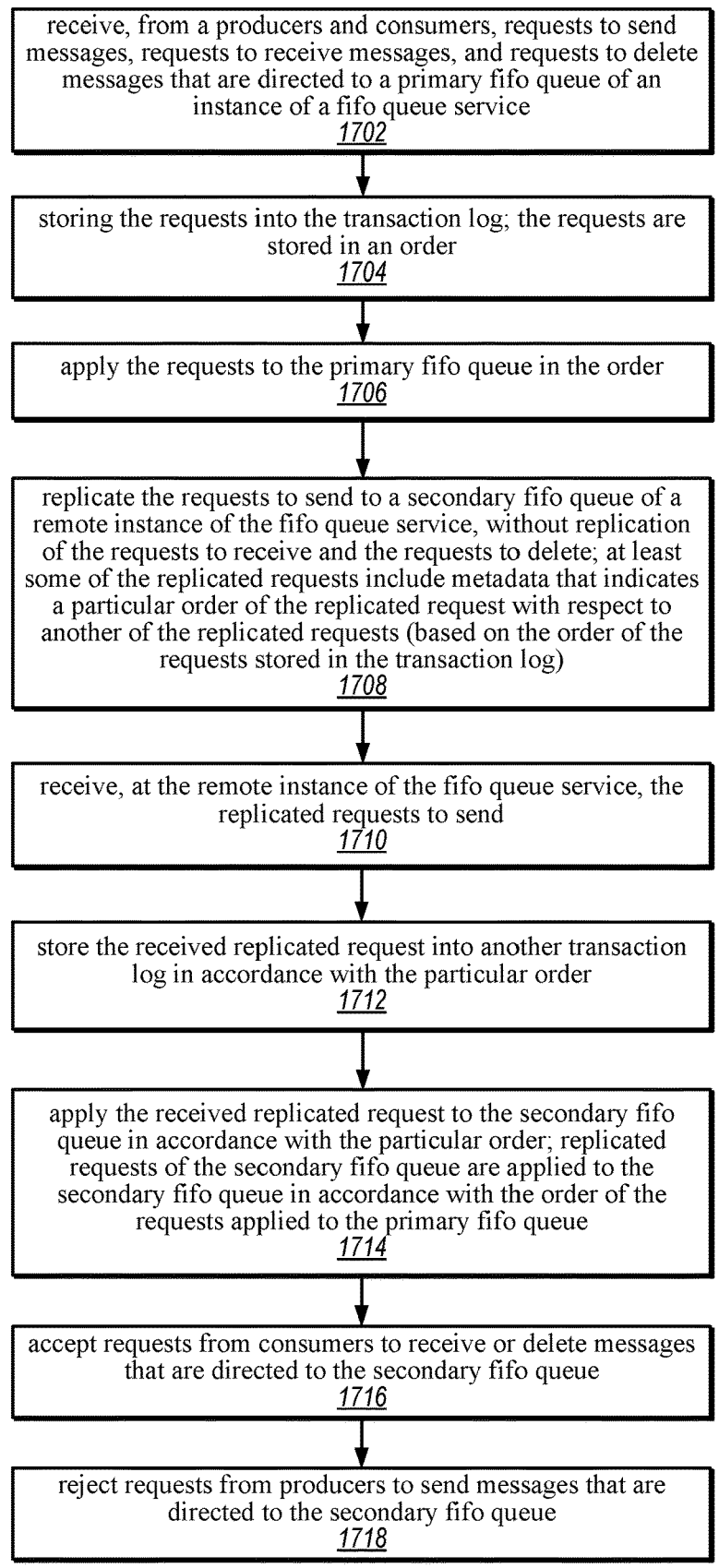
FIG. 17 illustrates a flow diagram for fifo queue fanout replication, according to some embodiments.

FIG. 17 illustrates a flow diagram for fifo queue fanout replication, according to some embodiments.

At block 1702, an instance of the fifo queue service receives, from a producers and consumers, requests to send messages, requests to receive messages, and requests to delete messages that are directed to a primary fifo queue of an instance of a fifo queue service. At block 1704, the instance stores the requests into the transaction log; the requests are stored in an order. At block 1706, the instance applies the requests to the primary fifo queue in the order.

At block 1708, the instance replicates the requests to send to a secondary fifo queue of a remote instance of the fifo queue service, without replication of the requests to receive and the requests to delete; at least some of the replicated requests include metadata that indicates a particular order of the replicated request with respect to another of the replicated requests (based on the order of the requests stored in the transaction log). At block 1710, the remote instance receives the replicated requests to send.

At block 1712, the remote instance stores the received replicated request into another transaction log in accordance with the particular order. At block 1714, the remote instance applies the received replicated request to the secondary fifo queue in accordance with the particular order; replicated requests of the secondary fifo queue are applied to the secondary fifo queue in accordance with the order of the requests applied to the primary fifo queue. At block 1716, the remote instance accepts requests from consumers to receive or delete messages that are directed to the secondary fifo queue. At block 1718, the remote instance rejects requests from producers to send messages that are directed to the secondary fifo queue.

The methods described herein may in various embodiments be implemented by any combination of hardware and software. For example, in one embodiment, the methods may be implemented by a computer system (e.g., a computer system as in FIG. 18) that includes one or more processors executing program instructions stored on a computer-readable storage medium coupled to the processors. The program instructions may implement the functionality described herein (e.g., the functionality of the queue services and other components that implement the techniques described herein). The various methods as illustrated in the figures and described herein represent example embodiments of methods. The order of any method may be changed, and various elements may be added, reordered, combined, omitted, modified, etc.

Figure 18:
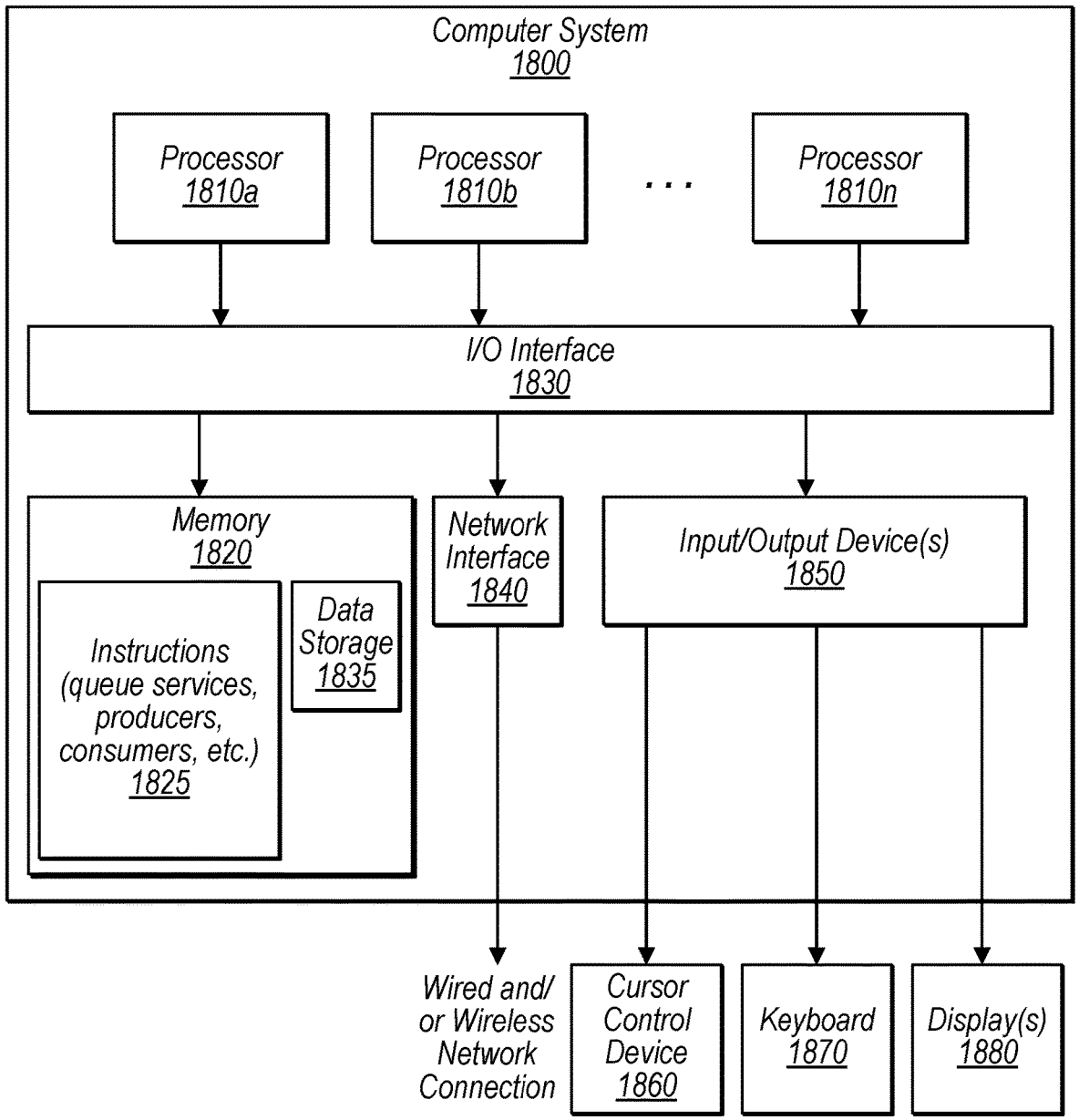
FIG. 18 is a block diagram illustrating an example computing system, according to some embodiments.

Embodiments to implement a global queue through replication and fifo queue replication as described herein may be executed on one or more computer systems, which may interact with various other systems or devices. One such computer system is illustrated by FIG. 18. In different embodiments, computer system 1800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. Display(s) may include standard computer monitor(s) and/or other display systems, technologies or devices, in one embodiment. In some embodiments, it is contemplated that embodiments may be implemented using a single instance of computer system 1800, while in other embodiments multiple such systems, or multiple nodes making up computer system 1800, may host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions, in one embodiment. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1820 may store program instructions 1825 and/or data accessible by processor 1810, in one embodiment. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the queue services, producers, consumers, etc.) are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800. A computer-accessible medium may include non-transitory storage media or memory media such as magnetic or optical media, e.g., disk or CD/DVD-ROM coupled to computer system 1800 via I/O interface 1830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840, in one embodiment.

In one embodiment, I/O interface 1830 may be coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may allow data to be exchanged between computer system 1800 and other devices attached to a network, such as other computer systems, or between nodes of computer system 1800, in one embodiment. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or retrieving data by one or more computer system 1800, in one embodiment. Multiple input/output devices 1850 may be present in computer system 1800 or may be distributed on various nodes of computer system 1800, in one embodiment. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1825, that implement the various embodiments of the systems as described herein, and data store 1835, comprising various data accessible by program instructions 1825, in one embodiment. In one embodiment, program instructions 1825 may include software elements of embodiments as described herein and as illustrated in the Figures. Data storage 1835 may include data that may be used in embodiments (e.g., data, code, etc.).

In other embodiments, other or different software elements and data may be included.

Those skilled in the art will appreciate that computer system 1800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1800 may be transmitted to computer system 1800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement an instance of a fifo queue service, wherein the instance is configured to, for individual ones of a plurality of primary fifo queues:
   receive a plurality of transactions from producers and consumers that are directed to the primary fifo queue, wherein the transactions comprise requests to send messages, requests to receive messages, and requests to delete messages;
   store the plurality of transactions into a transaction log, wherein the order of the transactions as stored is based on dependencies between different ones of the transactions;
   apply the transactions to the primary fifo queue in the order of the transactions;
   replicate the requests to send and the requests to delete to a secondary fifo queue of a remote instance of the fifo queue service, without replication of the requests to receive, wherein individual requests of the replicated requests comprise metadata that indicates a particular order of the replicated request with respect to other individual requests of the replicated requests based on the order of the transactions; and
one or more other processors; and
one or more other memories, wherein the one or more other memories have stored thereon instructions, which when executed by the one or more other processors, cause the one or more other processors to implement the remote instance of the fifo queue service, wherein the remote instance is configured to:
   receive at least a portion of the replicated requests;
   determine, based at least on the metadata of one of the received replicated requests that indicates the particular order of the received replicated request with respect to another of the received replicated requests, that the received replicated request can be stored into another transaction log in accordance with the particular order;
   in response to the determination, store the received replicated request into the other transaction log in accordance with the particular order; and
   apply the received replicated request to a secondary fifo queue in accordance with the particular order, wherein replicated requests of the secondary fifo queue are applied to the secondary fifo queue in accordance with the order of the transactions applied to the primary fifo queue.

2. The system of claim 1, wherein the remote instance of the queue service is further configured to:
   receive an application program interface (API) call for the secondary fifo queue to replace the primary fifo queue as a new primary fifo queue; and
   in response to the reception of the API call:
      accept subsequent requests to send messages, requests to receive messages, and requests to delete messages from producers and consumers that are directed to the new primary fifo queue; and
      reject subsequent replicated requests from the instance of the queue service to the new primary fifo queue.

3. The system of claim 1, wherein the remote instance of the queue service is further configured to:
   determine, based at least on the metadata of another of the received replicated requests that indicates the particular order of the other received replicated request with respect to an additional one of the replicated requests that was not received by the remote instance, that the other received replicated request is unable to be stored into the other transaction log in accordance with the particular order; and
   based on the determination that the other received replicated request is unable to be stored into the other transaction log in accordance with the particular order, reject the other received replicated request.

4. The system of claim 1, wherein the one or more other processors and the one or more other memories are located at a remote computing infrastructure collection, and wherein the instance of the queue service is further configured to, for a particular one of the plurality of primary fifo queues:
receive a plurality of other transactions from producers and consumers that are directed to the particular primary fifo queue, wherein the plurality of other transactions comprise other requests to send messages, other requests to receive messages, and other requests to delete messages;
store the plurality of other transactions into the transaction log, wherein an order of the other transactions as stored is based on dependencies between different ones of the other transactions;
apply the other transactions to the particular primary fifo queue in the order of the other transactions;
replicate the other requests to send and the other requests to delete to another secondary fifo queue of another remote instance of the fifo queue service located at another remote computing infrastructure collection, without replication of the requests to receive, wherein individual requests of the other replicated requests comprise metadata that indicates a particular order of the other replicated request with respect to other individual requests of the other replicated requests based on the order of the other transactions.

5. The system of claim 1, wherein the instance of the queue service is further configured to, for a particular one of the plurality of primary fifo queues:
receive a plurality of other transactions from producers and consumers that are directed to the particular primary fifo queue, wherein the other transactions comprise other requests to send messages, other requests to receive messages, and other requests to delete messages;
store the plurality of other transactions into the transaction log, wherein an order of the other transactions as stored is based on dependencies between different ones of the other transactions;
apply the other transactions to the particular primary fifo queue in the order of the other transactions; and
replicate the other requests to send to another secondary fifo queue of the remote instance of the fifo queue service, without replication of the requests to receive and the requests to delete, wherein individual requests of the other replicated requests comprise metadata that indicates a particular order of the other replicated request with respect to other individual requests of the other replicated requests based on the order of the other transactions;
and wherein the remote instance is further configured to:
accept requests from consumers to receive messages or to delete messages that are directed to the other secondary fifo queue; and
reject requests from producers to send messages that are directed to the other secondary fifo queue.

6. A method, comprising:
performing, by one or more computing devices that implement an instance of a fifo queue service:
receiving a plurality of transactions from producers and consumers that are directed to a primary fifo queue, wherein the transactions comprise requests to send messages, requests to receive messages, and requests to delete messages;
storing the plurality of transactions into a transaction log, wherein the transactions are stored in an order;
applying the transactions to the primary fifo queue in the order of the transactions; and
replicating the requests to send and the requests to delete to a secondary fifo queue of a remote instance of the fifo queue service, without replication of the requests to receive, wherein individual requests of the replicated requests comprise metadata that indicates a particular order of the replicated request with respect to other individual requests of the replicated requests based on the order of the transactions.

7. The method of claim 6, further comprising:
receiving an API call for the primary fifo queue to replace the secondary fifo queue as a new secondary fifo queue; and
in response to receiving the API call:
accepting subsequent replicated requests from the remote instance of the queue service; and
rejecting subsequent requests to send messages, requests to receive messages, and requests to delete messages from producers and consumers that are directed to the new secondary fifo queue.

8. The method of claim 6, further comprising:
determining that one or more role switching criteria are met; and
in response to determining that the one or more role switching criteria are met:
sending, to the remote instance, an API call for the secondary fifo queue to replace the primary fifo queue as a new primary fifo queue; and
accepting subsequent replicated requests from the remote instance of the queue service; and
rejecting subsequent requests to send messages, requests to receive messages, and requests to delete messages from producers and consumers that are directed to the new secondary fifo queue.

9. The method of claim 6, wherein applying the transactions to the primary fifo queue comprises performing one or more of:
applying the transactions to a plurality of hosts that host the primary fifo queue, or
applying individual ones of the transactions to a plurality of hosts that host the primary fifo queue.

10. The method of claim 6, wherein replicating the requests to send and the requests to delete to a secondary fifo queue of a remote instance of the fifo queue service comprises:
determining that at least one of the requests to delete is directed to a same message that at least one of the requests to send is directed to; and
in response to determining the at least one request to delete is directed to the same message as the at least one request to send, preventing replication of the at least one request to delete and the at least one request to send.

11. The method of claim 6, further comprising:
receiving, from the remote instance of the queue service, an indication that one or more of the replicated requests were rejected; and
in response to receiving the indication, replicating one or more of the transactions to the secondary fifo queue that are before the rejected request according to the order of the transactions.

12. The method of claim 6, further comprising:
determining a delay for replicating at least one of the transactions to the secondary queue is at least a threshold amount of time; and
in response to determining the delay for replicating the at least one transaction to the secondary queue is at least the threshold amount of time, reducing a rate of accepting additional requests to replicate transactions to the secondary queue.

13. The method of claim 6, further comprising:
receiving a plurality of other transactions from producers and consumers that are directed to another primary fifo queue, wherein the plurality of other transactions comprise other requests to send messages, other requests to receive messages, and other requests to delete messages;
storing the plurality of other transactions into the transaction log, wherein the other transactions are stored in another order;
applying the other transactions to the other primary fifo queue in the other order;
replicating the other requests to send and the other requests to delete to the secondary fifo queue of the remote instance of the fifo queue service, without replication of the requests to receive, wherein individual requests of the other replicated requests comprise metadata that indicates a particular order of the other replicated request with respect to other individual requests of the other replicated requests based on the other order.

14. The method of claim 6, further comprising:
receiving a plurality of other transactions from producers and consumers that are directed to another primary fifo queue, wherein the other transactions comprise other requests to send messages, other requests to receive messages, and other requests to delete messages;
storing the plurality of other transactions into the transaction log, wherein the other transactions are stored in another order;
applying the other transactions to the other primary fifo queue in the other order; and
replicating the other requests to send to another secondary fifo queue of the remote instance of the fifo queue service, without replication of the requests to receive and the requests to delete, wherein individual requests of the other replicated requests comprise metadata that indicates a particular order of the other replicated request with respect to other individual requests of the other replicated requests based on the other order.

15. One or more non-transitory computer-accessible storage media storing program instructions that when executed on or across one or more processors of a provider network cause the one or more processors to implement an instance of a fifo queue service to:
receive, from a remote instance of the fifo queue service, a plurality of replicated requests, wherein the replicated requests comprise one or more requests to send messages and one or more requests to delete messages replicated from the remote instance to a secondary fifo queue of the instance, and wherein individual requests of the replicated requests comprise metadata that indicates a particular order of the replicated request with respect to other individual requests of the replicated requests;
determine, based at least on the metadata of one of the received replicated requests that indicates the particular order of the received replicated request with respect to another of the received replicated requests, that the received replicated request can be stored into a transaction log in accordance with the particular order;
in response to the determination, store the received replicated request into the transaction log in accordance with the particular order; and
apply the received replicated request to the secondary fifo queue in accordance with the particular order, wherein replicated requests of the secondary fifo queue are applied to the secondary fifo queue in accordance with an order of transactions applied to a primary fifo queue of the remote instance of the fifo queue service.

16. The one or more storage media as recited in claim 15, wherein the program instructions when executed on or across the one or more processors further cause the one or more processors to:
receive an API call for the secondary fifo queue to replace the primary fifo queue as a new primary fifo queue; and
in response to the reception of the API call:
accept subsequent requests to send messages, requests to receive messages, and requests to delete messages from producers and consumers that are directed to the new primary fifo queue; and
reject subsequent requests replicated from the instance of the queue service to the new primary fifo queue.

17. The one or more storage media as recited in claim 15, wherein the program instructions when executed on or across the one or more processors further cause the one or more processors to:
determine, based at least on the metadata of another of the received replicated requests that indicates the particular order of the other received replicated request with respect to an additional request that was not received by the remote instance, that the other received replicated request is unable to be stored into the transaction log in accordance with the particular order; and
based on the determination that the other received replicated request is unable to be stored into the other transaction log in accordance with the particular order, send, to the remote instance, an indication that the other received replicated request was rejected.

18. The one or more storage media as recited in claim 15, wherein the program instructions when executed on or across the one or more processors further cause the one or more processors to:
determine, based at least on the metadata of another of the received replicated requests that indicates the particular order of the other received replicated request with respect to an additional request that was not received by the remote instance, that the other received replicated request is unable to be stored into the transaction log in accordance with the particular order; and
based on the determination that the other received replicated request is unable to be stored into the other transaction log in accordance with the particular order:
in response to passage of a predetermined threshold amount of time, determine, based at least on the metadata of the other received replicated request, that the other received replicated request can be stored into the transaction log in accordance with the particular order; and
in response to the determination, store the received replicated request into the transaction log in accordance with the particular order.

19. The one or more storage media as recited in claim 15, wherein the program instructions when executed on or across the one or more processors further cause the one or more processors to:

receive, from the remote instance, other replicated requests to send messages, wherein the other replicated requests are replicated to another secondary fifo queue, and wherein individual requests of the other replicated requests comprise metadata that indicates a particular order of the other replicated request with respect to other individual requests of the other replicated requests based on the order of the other transactions;

apply the received other replicated requests to another secondary fifo queue in accordance with the order of transactions applied to the primary fifo queue of the remote instance of the fifo queue service;

accept requests from consumers to receive messages or to delete messages that are directed to the other secondary fifo queue; and reject requests from producers to send messages that are directed to the other secondary fifo queue.

20. The one or more storage media as recited in claim 15, wherein the program instructions when executed on or across the one or more processors further cause the one or more processors to:

subsequent to the storage of the received replicated request into the transaction log in accordance with the particular order, replicate the received replicated request to a secondary fifo queue of another remote instance of the fifo queue service, wherein the replicated received replicated request comprises metadata that indicates a particular order of the replicated received replicated request with respect to other requests replicated to the secondary fifo queue of the other remote instance.

* * * * *